(12) United States Patent
Misra et al.

(10) Patent No.: US 9,374,280 B2
(45) Date of Patent: Jun. 21, 2016

(54) DEVICE-TO-DEVICE BASED CONTENT DELIVERY FOR TIME-CONSTRAINED COMMUNICATIONS

(71) Applicants: Saswat Misra, New York, NY (US);
Andrew K. Lang, New York, NY (US)

(72) Inventors: Saswat Misra, New York, NY (US);
Andrew K. Lang, New York, NY (US)

(73) Assignee: Vringo Infrastructure Inc., New York, NY (US)

( * ) Notice: Subject to any disclaimer, the term of this patent is extended or adjusted under 35 U.S.C. 154(b) by 0 days.

(21) Appl. No.: 14/490,506

(22) Filed: Sep. 18, 2014

(65) Prior Publication Data

US 2015/0006739 A1 Jan. 1, 2015

Related U.S. Application Data

(63) Continuation of application No. 14/098,390, filed on Dec. 5, 2013.

(60) Provisional application No. 61/871,032, filed on Aug. 28, 2013, provisional application No. 61/843,346, filed on Jul. 6, 2013, provisional application No. 61/821,044, filed on May 8, 2013.

(51) Int. Cl.
*H04Q 7/00* (2006.01)
*H04L 12/24* (2006.01)
(Continued)

(52) U.S. Cl.
CPC ............ *H04L 41/50* (2013.01); *H04L 5/0037* (2013.01); *H04L 43/0805* (2013.01); *H04L 47/70* (2013.01); *H04L 63/0853* (2013.01);
(Continued)

(58) Field of Classification Search
USPC ........................................................ 709/224
See application file for complete search history.

(56) References Cited

U.S. PATENT DOCUMENTS 5,314,372 A 5/1994 Kramer
5,612,668 A 3/1997 Scott
(Continued)

FOREIGN PATENT DOCUMENTS

AU 2003203717 11/2003
CN 1335032 2/2002
(Continued)

OTHER PUBLICATIONS

Search Report and Written Opinion dated May 8, 2014 issued in the corresponding International Patent Application No. PCT/US2014/037352.
(Continued)

*Primary Examiner* — Duc C Ho
(74) *Attorney, Agent, or Firm* — Cozen O'Connor

(57) ABSTRACT

A method for operating a server includes receiving, at the server, a request from a mobile device identifying a data file and retrieving the data file from a remote storage device in response to receiving the request. A party other than a party that operates the server operates the remote storage device. A number of collaborator devices are identified. Each of the number of collaborator devices is capable of establishing a mobile-to-mobile communications link with the mobile device. Respective portions of the data file are allocated to each of the number of collaborator devices based on at least one of (a) throughputs associated with the number of collaborator devices and (b) potential debits charged by the number of collaborator devices. Respective portions of the data file are transmitted to each of the number of collaborator devices according to the allocation.

20 Claims, 10 Drawing Sheets

(51) Int. Cl.
*H04M 15/00* (2006.01)
*H04L 29/06* (2006.01)
*H04L 5/00* (2006.01)
*H04W 4/24* (2009.01)
*H04L 12/26* (2006.01)
*H04L 12/911* (2013.01)
*H04W 12/06* (2009.01)
*H04W 84/12* (2009.01)
*H04W 88/04* (2009.01)
*H04W 12/02* (2009.01)
*H04L 29/08* (2006.01)

(52) U.S. Cl.
CPC .............. *H04M15/07* (2013.01); *H04M 15/46* (2013.01); *H04M 15/93* (2013.01); *H04W 4/24* (2013.01); *H04L 67/104* (2013.01); *H04M 15/31* (2013.01); *H04W 12/02* (2013.01); *H04W 12/06* (2013.01); *H04W 84/12* (2013.01); *H04W 88/04* (2013.01)

(56) References Cited

U.S. PATENT DOCUMENTS

| | | | |
|---|---|---|---|
| 5,635,903 | A | 6/1997 | Koike et al. |
| 6,198,696 | B1 | 3/2001 | Korpi et al. |
| 6,426,708 | B1 | 7/2002 | Trajkovic et al. |
| 6,636,790 | B1 | 10/2003 | Lightner et al. |
| 6,701,248 | B2 | 3/2004 | Petzold et al. |
| 6,839,079 | B2 | 1/2005 | Barlow et al. |
| 6,940,998 | B2 | 9/2005 | Garoutte |
| 6,956,501 | B2 | 10/2005 | Kitson |
| 7,076,441 | B2 | 7/2006 | Hind et al. |
| 7,076,466 | B2 | 7/2006 | Sansone |
| 7,080,038 | B2 | 7/2006 | Sansone |
| 7,089,210 | B2 | 8/2006 | Sansone |
| 7,095,323 | B2 | 8/2006 | Darty |
| 7,123,147 | B2 | 10/2006 | Engel |
| 7,133,743 | B2 | 11/2006 | Tilles et al. |
| 7,183,919 | B2 | 2/2007 | Wang |
| 7,187,285 | B2 | 3/2007 | Staples |
| 7,191,932 | B2 | 3/2007 | Fobbe et al. |
| 7,213,047 | B2 | 5/2007 | Yeager et al. |
| 7,222,779 | B1 | 5/2007 | Pineda-Sanchez et al. |
| 7,225,971 | B1 | 6/2007 | Cherry |
| 7,249,705 | B2 | 7/2007 | Dudley |
| 7,256,691 | B2 | 8/2007 | Awobue |
| 7,268,666 | B2 | 9/2007 | Fassbender et al. |
| 7,312,708 | B2 | 12/2007 | Tano |
| 7,333,017 | B2 | 2/2008 | Mori et al. |
| 7,337,944 | B2 | 3/2008 | Devar |
| 7,360,680 | B1 | 4/2008 | Grossmeyer |
| 7,382,252 | B2 | 6/2008 | Brannon |
| 7,398,915 | B1 | 7/2008 | Pineda-Sanchez et al. |
| 7,506,796 | B1 | 3/2009 | Hanna |
| 7,515,038 | B2 | 4/2009 | Mouri |
| 7,515,048 | B1 | 4/2009 | Bhattiprolu et al. |
| 7,525,429 | B2 | 4/2009 | Carrigan |
| 7,597,256 | B2 | 10/2009 | Stevens |
| 7,608,790 | B2 | 10/2009 | Patton |
| 7,609,952 | B2 | 10/2009 | Jezierski et al. |
| 7,731,089 | B2 | 6/2010 | Chang et al. |
| 7,786,862 | B1 | 8/2010 | Campbell |
| 7,815,112 | B2 | 10/2010 | Volpe et al. |
| 7,843,340 | B2 | 11/2010 | Davis |
| 7,859,417 | B2 | 12/2010 | Harper et al. |
| 7,913,898 | B2 | 3/2011 | Frankenberg et al. |
| 7,928,842 | B2 | 4/2011 | Jezierski et al. |
| 7,999,656 | B2 | 8/2011 | Fisher |
| 8,044,786 | B2 | 10/2011 | Berdichevsky et al. |
| 8,059,012 | B2 | 11/2011 | Bai et al. |
| 8,150,656 | B2 | 4/2012 | Kunkel |
| 8,160,599 | B2 | 4/2012 | Stanforth et al. |
| 8,164,452 | B2 | 4/2012 | Moses et al. |
| 8,170,056 | B2 | 5/2012 | Allen et al. |
| 8,193,933 | B2 | 6/2012 | Jezierski et al. |
| 8,198,982 | B2 | 6/2012 | Marmigere et al. |
| 8,217,767 | B2 | 7/2012 | Nakayama |
| 8,299,923 | B2 | 10/2012 | Hammoud |
| 8,305,936 | B2 | 11/2012 | Wang |
| 8,320,581 | B2 | 11/2012 | Hera et al. |
| 8,351,971 | B2 | 1/2013 | Spjuth |
| 8,354,926 | B2 | 1/2013 | Donovan et al. |
| 8,358,199 | B2 | 1/2013 | Nesling |
| 8,380,558 | B1 | 2/2013 | Sharma et al. |
| 8,430,310 | B1 | 4/2013 | Ho et al. |
| 8,441,338 | B2 | 5/2013 | Naressi et al. |
| 8,504,008 | B1 | 8/2013 | Gossweiler, III et al. |
| 8,514,825 | B1 | 8/2013 | Addepalli et al. |
| 8,554,495 | B2 | 10/2013 | Mack et al. |
| 8,655,795 | B1 | 2/2014 | Kolchin |
| 8,919,637 | B2 | 12/2014 | Kim et al. |
| 2001/0005217 | A1 | 6/2001 | Hamilton et al. |
| 2002/0198653 | A1 | 12/2002 | Lutter |
| 2005/0071119 | A1 | 3/2005 | Obradovich et al. |
| 2005/0138198 | A1* | 6/2005 | May .................. H04L 69/24 709/233 |
| 2006/0261931 | A1 | 11/2006 | Cheng |
| 2007/0073585 | A1 | 3/2007 | Apple et al. |
| 2007/0247276 | A1 | 10/2007 | Murchison et al. |
| 2007/0256135 | A1 | 11/2007 | Doradla et al. |
| 2008/0104170 | A1* | 5/2008 | Ananthanarayanan . H04L 67/06 709/204 |
| 2008/0165701 | A1 | 7/2008 | Ananthanarayanan et al. |
| 2008/0278323 | A1 | 11/2008 | Jackson |
| 2009/0106260 | A1* | 4/2009 | Eshwar ................. H04L 67/06 |
| 2009/0180359 | A1 | 7/2009 | Walter |
| 2009/0216686 | A1 | 8/2009 | Jouvin et al. |
| 2009/0219169 | A1 | 9/2009 | Herwats |
| 2009/0224889 | A1 | 9/2009 | Aggarwal et al. |
| 2009/0259710 | A1* | 10/2009 | Porio ..................... H04L 67/16 709/201 |
| 2009/0281718 | A1 | 11/2009 | Gibran et al. |
| 2010/0001861 | A1 | 1/2010 | Davis |
| 2010/0019482 | A1 | 1/2010 | Kumagai et al. |
| 2010/0033328 | A1 | 2/2010 | Moses et al. |
| 2010/0097222 | A1 | 4/2010 | Marmigere et al. |
| 2010/0135168 | A1* | 6/2010 | Chen ..................... H04L 41/12 370/252 |
| 2010/0191964 | A1 | 7/2010 | Haddad et al. |
| 2010/0235285 | A1 | 9/2010 | Hoffberg |
| 2010/0253518 | A1 | 10/2010 | Hammoud |
| 2010/0317391 | A1 | 12/2010 | Mody et al. |
| 2011/0072143 | A1* | 3/2011 | Kuo ...................... H04L 67/104 709/230 |
| 2011/0117907 | A1 | 5/2011 | Hooli et al. |
| 2011/0159808 | A1 | 6/2011 | Kenington et al. |
| 2011/0237287 | A1 | 9/2011 | Klein et al. |
| 2011/0246692 | A1 | 10/2011 | Valk et al. |
| 2012/0020216 | A1 | 1/2012 | Vashist et al. |
| 2012/0026992 | A1 | 2/2012 | Navda et al. |
| 2012/0030342 | A1 | 2/2012 | Willink et al. |
| 2012/0039183 | A1 | 2/2012 | Barbieri et al. |
| 2012/0087588 | A1 | 4/2012 | Carter |
| 2012/0105195 | A1 | 5/2012 | Schultz |
| 2012/0244847 | A1 | 9/2012 | Chandra et al. |
| 2012/0329384 | A1 | 12/2012 | Boldyrev et al. |
| 2013/0019284 | A1 | 1/2013 | Pacyga et al. |
| 2013/0029705 | A1 | 1/2013 | Chen et al. |
| 2013/0031042 | A1 | 1/2013 | Dehnie et al. |
| 2013/0038450 | A1 | 2/2013 | Stewart |
| 2013/0039256 | A1 | 2/2013 | Shin et al. |
| 2013/0057686 | A1 | 3/2013 | Genc et al. |
| 2013/0090844 | A1 | 4/2013 | Rakshit |
| 2013/0110583 | A1 | 5/2013 | Ormont et al. |
| 2013/0147626 | A1 | 6/2013 | Hammoud |
| 2013/0211893 | A1 | 8/2013 | Bryant et al. |
| 2014/0237044 | A1* | 8/2014 | Scott ................... H04L 65/4007 709/204 |

FOREIGN PATENT DOCUMENTS

| | | |
|---|---|---|
| CN | 1382355 | 11/2002 |
| EP | 2 491 547 | 8/2012 |

(56) References Cited

FOREIGN PATENT DOCUMENTS

| | | |
|---|---|---|
| EP | 2 505 432 | 10/2012 |
| EP | 2 534 348 | 12/2012 |
| JP | 2010-207519 | 9/2010 |
| WO | WO 00/12354 | 3/2000 |
| WO | WO 00/27051 | 5/2000 |
| WO | WO 03/083754 | 10/2003 |
| WO | WO 2011/132347 | 10/2011 |
| WO | WO 2011/143761 | 11/2011 |
| WO | WO 2012/050913 | 4/2012 |
| WO | WO 2012/076192 | 6/2012 |
| WO | WO 2012/143936 | 10/2012 |
| WO | WO 2013/093906 | 6/2013 |
| WO | WO 2013/095506 | 6/2013 |

OTHER PUBLICATIONS

Mudambai et al., "Distributed Transmit Beamforming: Challenges and Recent Progress", 2009, pp. 1-12.
Wikipedia, "Vehicular communication systems", Sep. 14, 2015, pp. 1-8.
Wikipedia, "Intelligent transportation system", Oct. 5, 2015, pp. 1-10.
Kageyama, "Toyota tests cars that communicate with each other", Nov. 12, 2012, pp. 1-4.
King et al., "Compass: A Probabilistic Indoor Positioning System Based on 802.11 and Digital Compasses", WiNTECH Proceedings of the $1^{st}$ International workshop on Wireless network testbeds, experimental evaluation & characterization, Sep. 2006, pp. 34-40.
Mozumdar et al., "An algorithm for selecting the cluster leader partially connected sensor network", 2008, pp. 133-138.
Saeed et al., "Towards Dynamic Real-Time Geo-location Databases for TV White Spaces", Mar. 16, 2013, 8 pages.
Greeley, "Bandwith-trading app challenges carriers", Feb. 3, 2013, 2 pages.
opengarden.com, "Open Garden", retrieved on Oct. 22, 2 pages.
Kim, "Open Garden lets mobile users cultivate a crowdsourced mesh network", May 22, 2012, 7 pages.
Udgata et al., "Swarm intelligence based resource allocation algorithm for cognitive radio network", 2010, $1^{st}$ International Conference on Parallel, Distributed and Grid Computing, PDGC-2010 pp. 324-329.
Woyach et al., "Crime and Punishment for Cognitive Radio", Department of Electrical Engineering and Computer Sciences, University of California, Berkeley, CA, retrieved on Oct. 22, 2015, 8 pages.
Vanhemert, "This Startup's Cheap Sensors Could Create an OS for Everyday Life", Aug. 7, 2013, 13 pages.
Chen et al., "MobiCent: a Credit-Based Incentive System for Disruption Tolerant Network", 2010, pp. 1-24.
Holsonics, "audiospotlight Technology", 1999-2009, 2 pages.
Soundlazer, "What is a parametric speaker?", 2015, 10 pages.
Sierra Wireless, "Solutions for a Connected Automotive Industry", 2012, 4 pages.
USPS, "USPS Mobile", 2015, 3 pages.
Venture Beat, "USPS surprises CES with eye-popping app that brings mail to life (video)", Jan. 10, 2013, 6 pages.
Wessel, "Saudi Post Adds Intelligence to Mailboxes", RFID in Health Care, Dec. 2-3, 2015, San Francisco, CA, 2 pages.
RFID Arena, "National post office RFID system", Sep. 26, 2012, 7 pages.
Melia-Segui et al., "RFID EPC-Gen2 for Postal Applications: A Security and Privacy Survey", 2010, 6 pages.
Harper, "Paper mail in the home of the $21^{st}$ century: An analysis of the future of paper mail and implications for the design of electronic alternatives", Apr. 2002, 2 pages.
Park et al., "A Design of the Intelligent Black Box using Mining Algorithm", Daelim University, Mokwon University, Korea, International Journal of Smart Home, vol. 6, No. 2, Apr. 2012, 6 pages.
Telegraph Co., "Intelligent cars will report accidents to authorities", Jul. 3, 2010, 2 pages.
Maleki et al., "Intelligent Alarm System for Road Collision", Department of Surveying and Geomatics Engineering, College of Engineering, University of Tehran, Journal of Earth Science and Engineering, vol. 1, 2011, pp. 162-168.
Empson, "WTF Is Waze and Why Did Google Just Pay a Billion+ for It?", Jun. 11, 2013, 11 pages.
bepark.com, "Bepark", retrieved on Oct. 22, 2015, 1 page.
Liang et al., "Optimal Bandwidth Sharing in Multi-Swarm Multi-Party P2P Video Conferencing Systems", Apr. 21, 2011, 14 pages.
Curran et al., "An Evaluation of Indoor Location Determination Technologies", Journal of Location Based Services, vol. 5, No. 2, Jun. 2011, 17 pages.
Liu, "Survey of Wireless Indoor Positioning Techniques and Systems", retrieved on Oct. 30, 2015, 15 pages.
"RFID & GSM based mail box.mp4", You Tube Video, retrieved on Oct. 22, 2015, 2 pages.

\* cited by examiner

500

DEVICE-TO-DEVICE BASED CONTENT DELIVERY FOR TIME-CONSTRAINED COMMUNICATIONS

CROSS-REFERENCE TO RELATED APPLICATIONS

This application is a Continuation of U.S. patent application Ser. No. 14/098,390 which was filed with the U.S. Patent and Trademark Office on Dec. 5, 2013. This disclosure claims the benefit of, and priority to, U.S. Provisional Application No. 61/871,032, filed on Aug. 28, 2013, U.S. Provisional Application No. 61/843,346, filed on Jul. 6, 2013, and U.S. Provisional Application No. 61/821,044, filed on May 8, 2013, each of which is hereby incorporated herein by reference in its respective entirety.

FIELD OF THE INVENTION

The invention relates to cognitive radio topologies and more specifically to a distributed cognitive radio network comprising WiFi hotspots to which devices connect and clusters of devices or hotspots.

SUMMARY OF THE INVENTION

A method for operating a server comprising:
  receiving, at the server, a request from a mobile device identifying a data file;
  causing retrieval of the data file from a remote storage device in response to receiving the request, wherein the remote storage device is operated by a party other than a party that operates the server;
  identifying a number of collaborator devices, wherein each of the number of collaborator devices is capable of establishing a mobile-to-mobile communications link with the mobile device;
  allocating respective portions of the data file to each of the number of collaborator devices based on at least one of (a) throughputs associated with the number of collaborator devices and (b) potential debits charged by the number of collaborator devices; and
  causing transmission of respective portions of the data file to each of the number of collaborator devices according to the allocation.

According to one advantage, the request is identified as having been generated by a mobile application executing on the mobile device.

According to one advantage, causing retrieval of the data file from the storage device comprises causing sending of a request to the storage device, the request to the storage device identifying the server but not identifying the mobile device.

According to one advantage, identifying the number of collaborator devices comprises accessing a database of potential collaborator devices and corresponding geographic locations of those potential collaborator devices.

According to one advantage, identifying the number of collaborator devices comprises:
  causing a broadcasting of a message to potential collaborator devices; and
  receiving position information associated with each potential collaborator device in response to the broadcasting.

According to one advantage, identifying the number of collaborator devices comprises determining whether to include a potential collaborator device in the number of collaborator devices based on the position information associated with that collaborator device.

According to one advantage, allocating the respective portions of the data file to each of the number of collaborator devices comprises receiving allocation instructions from the mobile device.

According to one advantage, identifying a number of collaborator devices comprises receiving identification of the number of collaborator devices from the mobile device.

According to one advantage, identifying a number of collaborator devices comprises selecting the number of collaborator devices from a number of potential collaborator devices at the server.

According to one advantage, each of the number of collaborator devices is a mobile device.

According to one advantage, the number of collaborator devices comprises a tablet computing device.

According to one advantage, data sizes of the respective portions of the data file depend on at least one latency requirement indicated by the request identifying the data file.

According to one advantage, the respective portions of the data file allocated to one of the number of collaborator devices comprises a first portion of a data file and a second portion of the data file separated by a third portion of the data file.

According to one advantage, one of the number of collaborator devices is capable of an LTE-Direct based mobile-to-mobile communications link with the mobile device.

According to one advantage, identifying the number of collaborator devices comprises:
  causing transmission of a message from the mobile device to potential collaborator devices located in the vicinity of the mobile device; and
  in response to the transmission, receiving at least one response message identifying the number of collaborator devices.

According to one advantage, the method further comprises causing transmission of instructions to generate, on a display of the mobile device, a listing of potential collaborator devices, wherein the listing for each potential collaborator device includes an indication of (a) throughput or (b) potential debits associated with that potential collaborator device.

According to one advantage, the debits are assessed in the form of Bitcoins.

According to one advantage, the method further comprises:
  determining a current effective throughput of the mobile device in response to receiving the remote request; and
  in response to determination that the current effective throughput of the mobile device is not sufficient to download the data file within a specified time constraint, performing the identification of the number of collaborator devices.

A computing device storing computer executable instructions, which when executed by a processor, cause the computing device to perform a method comprising:
  receiving a request from a mobile device identifying a data file;
  causing retrieval of the data file from a remote storage device in response to receiving the request, wherein the remote storage device is operated by a party other than a party that operates the computing device;
  identifying a number of collaborator devices, wherein each of the number of collaborator devices is capable of establishing a mobile-to-mobile communications link with the mobile device;
  allocating respective portions of the data file to each of the number of collaborator devices based on at least one of (a) throughputs associated with the number of collaborator devices and (b) potential debits charged by the number of collaborator devices; and causing transmission of respective portions of the data file to each of the number of collaborator devices according to the allocation.

According to one advantage, the request is identified as having been generated by a mobile application executing on the mobile device.

According to one advantage, causing retrieval of the data file from the storage device comprises causing sending of a request to the server, the request to the server identifying the computing device but not identifying the mobile device.

According to one advantage, identifying the number of collaborator devices comprises accessing a database of potential collaborator devices and corresponding geographic locations of those potential collaborator devices.

According to one advantage, identifying the number of collaborator devices comprises:

causing a broadcasting of a message to potential collaborator devices; and receiving position information associated with each potential collaborator device in response to the broadcasting.

According to one advantage, identifying the number of collaborator devices comprises determining whether to include a potential collaborator device in the number of collaborator devices based on the position information associated with that collaborator device.

According to one advantage, allocating the respective portions of the data file to each of the number of collaborator devices comprises receiving allocation instructions from the mobile device.

According to one advantage, identifying a number of collaborator devices comprises receiving identification of the number of collaborator devices from the mobile device.

According to one advantage, identifying a number of collaborator devices comprises selecting the number of collaborator devices from a number of potential collaborator devices at the computing device.

According to one advantage, the number of collaborator devices comprises a tablet computing device.

According to one advantage, data sizes of the respective portions of the data file depend on at least one latency requirement indicated by the request identifying the data file.

According to one advantage, the respective portions of the data file allocated to one of the number of collaborator devices comprises a first portion of a data file and a second portion of the data file separated by a third portion of the data file.

According to one advantage, one of the number of collaborator devices is capable of an LTE-Direct based mobile-to-mobile communications link with the mobile device.

According to one advantage, n identifying the number of collaborator devices comprises:

causing transmission of a message from the mobile device to potential collaborator devices located in the vicinity of the mobile device; and in response to the transmission, receiving at least one response message identifying the number of collaborator devices.

According to one advantage, instructions are transmitted to cause generation, on a display of the mobile device, a listing of potential collaborator devices, wherein the listing for each potential collaborator device includes an indication of (a) throughput or (b) potential debits associated with that potential collaborator device.

DETAILED DESCRIPTION OF THE PREFERRED EMBODIMENT

International Mobile Subscriber Identity (IMSI) Pool

Figure 1:
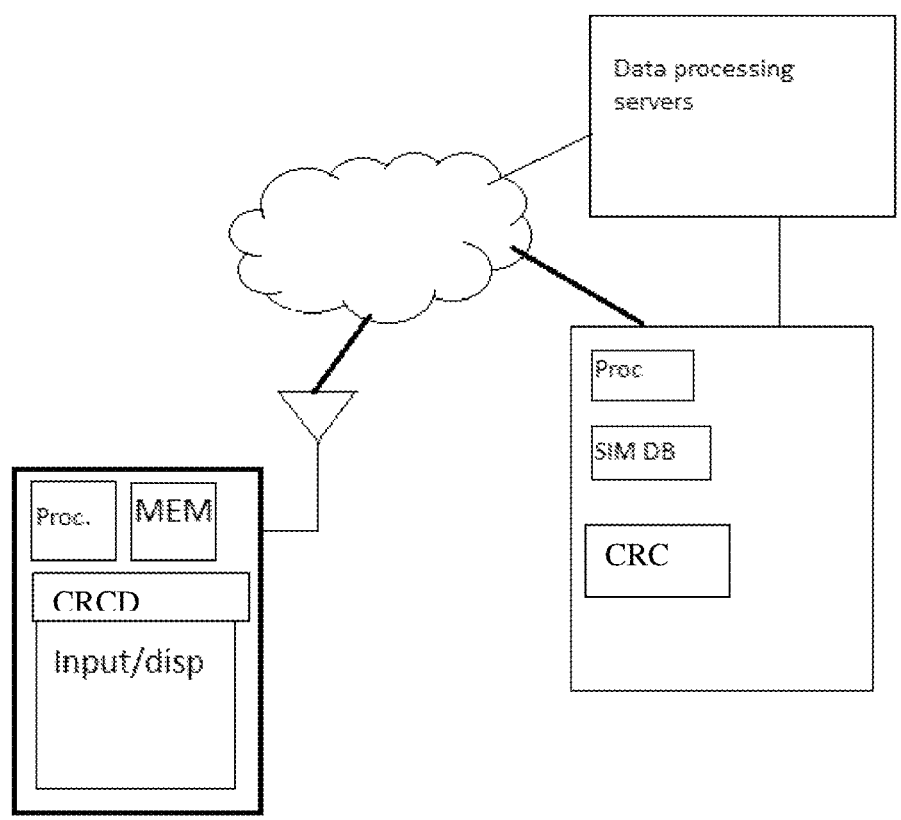
FIG. 1 is a system for providing an IMSI from the IMSI pool.

A Cognitive Radio Carrier Device (CRCD) provides a communication device to a (Cognitive Radio Carrier) CRC customer. Alternatively, the CRC customer owns an "unlocked" device. The CRCD customer maintains a service contract with the CRC. The CRCD is configured to seek out the lowest cost, most efficient manner of staying connected, and adapts this connection to the amount of bandwidth needed by the customer at a given time. For example, the CRCD will seek out the lowest cost cellular provider or, if near a WiFi hotspot, the CRCD will connect via the WiFi hotspot. When WiFi is available, the CRCD does not maintain an active IMSI with a TC and voice calls are handled through VOIP.

The CRC customer is given a virtual phone number that the CRC forwards to the CRCD through an active connection to the CRCD. The active connection can be any communication channel such as data/VOIP, traditional voice through a telephone carrier (TC), and the like.

In one embodiment, the communication channel can include peer-to-peer connectivity. In other words, if one CRCD is near another CRCD that has peer-to-peer connectivity, the CRCD may use mesh networking to connect through that device to the CRC.

If the only connectivity available is through a TC, then the CRCD uses a virtual SIM from the pool that offers the lowest cost for the highest bandwidth. In one arrangement, the CRCD sends a message to a CRC server informing the CRC of a communications bandwidth requested by the CRCD. In response to the message, the CRC determines the lowest cost SIM that, when added to a collection of SIMS already in use by the CRCD, enables the CRCD to communicate with at least the requested communications bandwidth. Multiple such connections with multiple carriers on the virtual SIM may be used simultaneously in a fused manner when customer demand for higher bandwidth is needed. In one embodiment, the CRDC periodically contacts the CRC periodically to receive the virtual SIM that offers the lowest cost highest bandwidth communication. The virtual SIM is provided on an as needed basis. If additional bandwidth is needed, the CRCD is preferably configured to use multiple virtual SIMs to communicate via multiple parallel communication channels.

The CRCD includes one or more of battery management software and power management software and related sensors as required to perform the battery management and/or power management. When available power gets low or if the CRCD determines that power is at a premium power usage and/or availability is also considered when optimizing the cost and available bandwidth of various connection channels. In one embodiment, the CRCD determines via GPS, cell tower triangulation, or other positioning calculations, if it is far from normal places of connectivity and thus traveling. In one embodiment, the CRCD includes the amount of power that will be used by each connection type and how important power/energy conservation is at a given time for that customer in selecting the cost/bandwidth channel. If multiple cell towers with different TCs are available at varying distances, and the device can save power by choosing the closest one and thereby needing less power to broadcast, that can be used as part of the connection optimization function. In other words, the cost, bandwidth, and anticipated power expenditure associated with use (e.g., transmission) of various virtual SIMs are considered when an appropriate virtual SIM is selected.

In one embodiment, the CRCD can operate in multiple modes such as a low latency mode, a high quality mode or a high robustness mode. In some arrangements, the phone automatically switches between these modes based on application-specific requirements. For example, when the CRCD determines that streaming video is being accessed and that a video buffer is nearly full, the CRCD automatically switches to the lowest latency mode. In some arrangements, a user may manually switch between modes by adjusting setting via software options accessible on the CRCD. In some arrangements, the CRCD achieves various modes by switching between different sets of SIMs (real and/or virtual) and therefore different carriers. In practice, switching between different sets of SIMs may include enabling at least one inactive virtual SIM stored at a mobile device and/or disabling at least one active SIM stored at the mobile device.

The lowest latency mode can be used for very long distance voice calls or data connections where delay and/or latency becomes severe enough to be problematic. The voice transmission and/or data is sent redundantly across multiple TCs or other channels. Each of the alternative channels competes to transmit the signal to the endpoint. At the endpoint, redundant data is discarded when it arrives. It should be noted that before the data is discarded any errors in the first to arrive data can be corrected with the later arriving data. In use, there is no single channel that will typically have the lowest latency. The lowest latency channel may be one of many different channels at any given time. When demand for lowest latency is at a premium, such as during an important international business conference call, the lowest latency mode provides substantially uninterrupted communication.

In the highest quality mode, is similar to the lowest latency mode, but focuses on achieving the highest clarity for voice calls. The highest quality mode is typically used during times when there is a high demand for the highest clarity for voice calls. Multiple communications channels (e.g., frequency bands) for voice and/or data are used to build up the truest voice signal with highest clarity.

In the highest robustness mode multiple channels of voice/data are utilized to avoid dropped calls or gaps in voice signal, possibly due to dropped packets or voice channels with significant noise. Multiple channels are utilized to ensure complete packet transmission or to avoid channels with significant noise.

In one embodiment, the CRCD stores at least one virtual SIM locally so that a connection can always be made via a TC.

In one embodiment, the CRC charges the customer a fixed monthly fee plus a fee based on the amount of active usage of virtual SIM cards from the pool, thereby incentivizing and encouraging customers to make use of lower cost connections to the extent the customer has such options available.

Because the CRC might have 1 million virtual SIMs for its 10 million customers there is an inherent cost savings over a traditional 1-1 ratio. Given the option to use different virtual SIMs, customers can use the best TC available when necessary thereby getting better coverage and less dead spot time. Customers can travel globally for no additional cost and use local SIMs as needed. Customers can fuse multiple connections for higher bandwidth when necessary. Because SIMs are shared across a pool and are rotated across many customers, customers gain a level of privacy and anonymity since they can not be as easily tracked or spied upon. As discussed above, the virtual SIMs can also be used to provide power savings options.

A process for preloading virtual SIMs for situations such as having no connections available except for TC ones are provided in accordance with the above. For example, a common pool of "switching virtual SIMs" can be maintained on many devices including the CRCD. These switching virtual SIMs are used when there is no current active SIM being used on a CRCD and no other connection type is available except for TC. The CRCD picks one of these virtual SIMs at random, quickly sends the CRC its status and which TCs currently have strong signals, and requests one or more virtual SIMs to use exclusively. The CRC assigns one from the pool, and the CRCD quickly inactivates the switching SIM so that other devices in the same predicament may use it if needed. The idea is to minimize "collisions" in which more than one CRCD is trying to use the same switching virtual SIM at the same time.

In one embodiment, the optimal connection is chosen based at least in part on anticipated customer usage and patterns. This analysis improves with machine learning of user behavior. Preferably, the CRCD is not constantly flipping between multiple connection types as that will cause data/voice disruptions and higher overhead of switching connection types.

A shown in FIG. 1, the CRCD includes a processor, a transmitter, a receiver, an input device, and at least one memory to store one or more virtual SIMs. The input device of the CRCD is typically a touchscreen or keypad. The CRC includes networking connections, a processor, a transmitter, a receiver, and a database that stores virtual SIMs. In one embodiment, the CRC determines the best virtual SIM for a given CRCD in a given situation and sends the virtual SIM to the CRCD. Alternatively, the CRCD determines the parameters for a virtual SIM and requests the virtual SIM from the CRC. In yet another embodiment, the CRCD provides the selection criteria to the CRC and the CRC matches a virtual SIM to the criteria and sends the virtual SIM to the CRCD.

In one embodiment, the SIMs are stored in one or more data processing servers. The data processing servers receive instructions from the CRC to provide the SIMs to the CRCD. Alternatively, the CRCD requests a SIM that is provided by the data processing servers.

The pool of virtual SIMs is preferably maintained on the carrier side. The system as a whole can alternatively perform much of the Cognitive/Intelligence in the cloud (on the carrier's servers) rather than on the end device. Better system optimizations can be achieved if each end device shares all its data on wireless spectrum patterns so that global efficiencies and patterns can be leveraged.

As would be understood by one of ordinary skill in the art, based on the disclosure and teachings herein, a CRCD is any suitable device with SIM functionality. For example, in various arrangements, a CRCD corresponds to a mobile device, such as a cell phone, a tablet computer, or a portable digital assistant. In various arrangements, a CRCD corresponds to a desktop computing system.

Dispersed Sinks for Processing Device-to-Device Relayed Data

Figure 2:
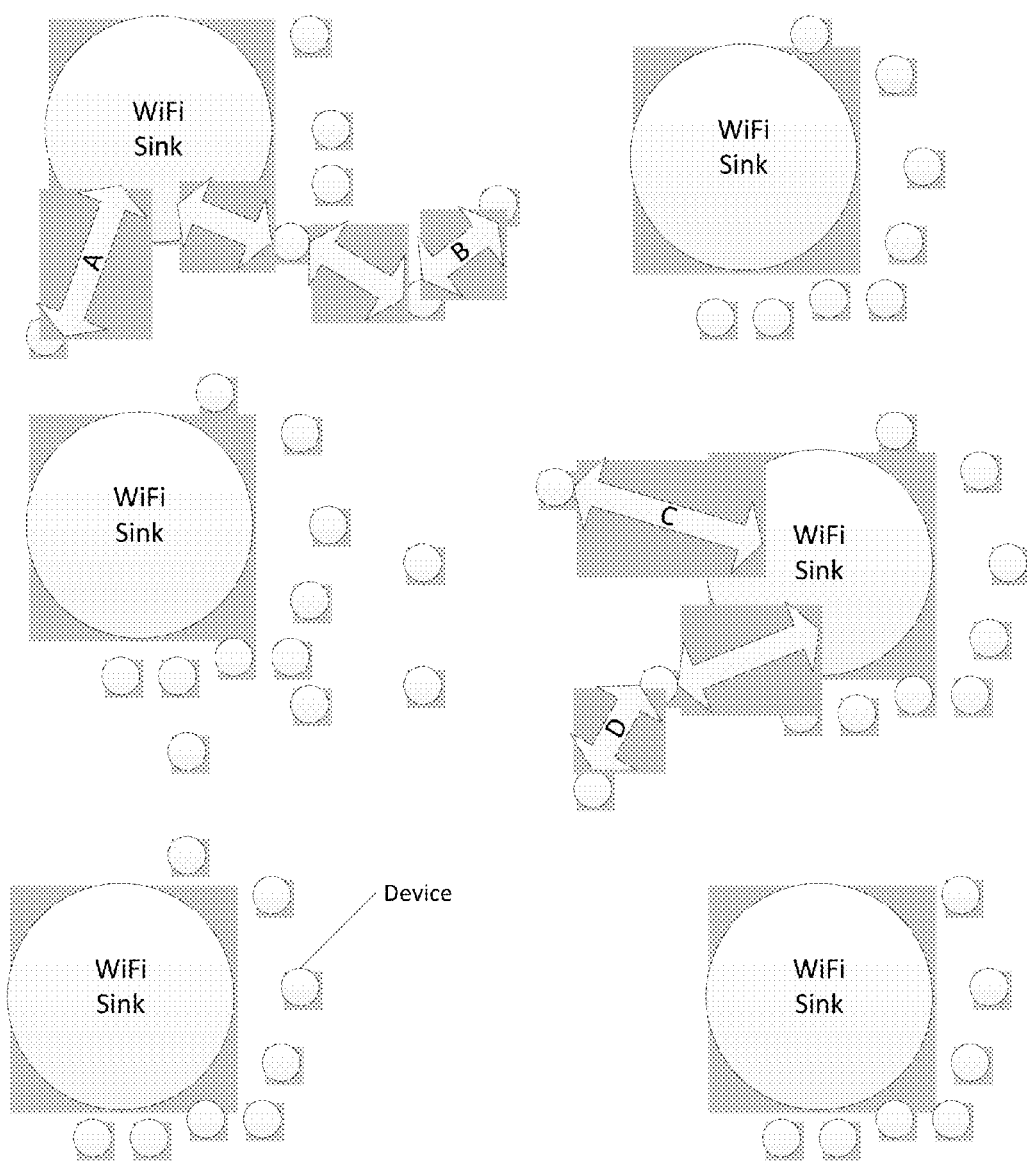
FIG. 2 is a topology for a cognitive radio network.

FIG. 2 depicts a topology for a cognitive radio network. The topology includes a number of WiFi sinks, also referred to as WiFi hotspots. Each WiFi sink has one or more associated devices, each of which sends data to and/or receives data from the WiFi sink. The devices are wireless or wired and generally include cell phones, tablets, laptops, desktop computers, and portable digital assistants. Each device sends its data to exactly one of the WiFi sinks shown in FIG. 2 at any point in time (although the WiFi sink so nominated may change over time). In particular, data may be sent from a device to a WiFi sink either directly (as in the routes labeled "A" and "C" in FIG. 1) or through a series of two or more device-to-device ("D2D") connections (as in the routes labeled "B" and "D" in FIG. 2; each route involves two D2D connections).

A given D2D connection may be established and maintained using a cellular connection (e.g., an LTE-based D2D protocol), a WiFi connection, a Bluetooth connection, a directed laser connection, or any other suitable type of connection. Further, each device may maintain a listing of "backup" WiFi sinks to use in case communications becomes unresponsive with respect to its currently nominated WiFi sink. WiFi sinks route the data that they receive to other destinations by sending the data via a wired connection to the Internet. Alternatively, the WiFi sinks route the data that they receive to other destinations by sending the data via a wireless connection to the Internet via a cellular provider.

As shown in FIG. 2, WiFi sinks are irregularly placed in a region. In one arrangement, all WiFi sinks in a given region are controlled by a single entity (e.g., Time Warner Cable), while, in another arrangement, a wide variety of different persons/entities own and operate the various WiFi sinks in an area. For example, a bodega owner, a food truck owner, and a Laundromat owner in New York City may separately purchase and install their own WiFi sinks for public use. Generally, the owner of a WiFi sink charges devices for the use of the WiFi sink. The charge for using a given WiFi sink can be determined by the owner/operator of the WiFi sink. The charges can be based in the period of time the WiFi sink is accessed, the amount of data received, the amount of data sent, the bandwidth used, or another measurable communication metric or a combination of such communication metrics.

In the case that WiFi sinks are owned by different persons/entities, the protocols used to grant, deny, and/or prioritize device access to a WiFi sink may be customized by their owners. This results in a competition as owners of WiFi sinks seek to customize their "access policies" to attract devices (i.e., customers) to their WiFi sink and increase the average spend per customer in relation to their WiFi sink. For example, in an attempt to attract devices, a WiFi sink owner may deprioritize (or deny access) to a device that has a poor community reputation (e.g., those devices that transmit too much data and therefore have a reputation for causing interference with other devices), install large bandwidth sinks, and the like.

WiFi sinks are generally irregularly spaced in a geographic area based on the opportunities perceived by WiFi sink providers. Further, a given network, such as the one pictured in FIG. 2, may be on the order of hundreds of square miles, much larger, or much smaller. FIG. 2 shows devices "clumped" around WiFi sinks and this may be the case, e.g., in rural communities that have WiFi sinks centered in population hubs (e.g., popular shopping areas). However, in many scenarios, e.g., in a densely packet urban area, devices will be more uniformly distributed through a given geographic area and potentially a large number of D2D hops will be used to connect a given device to a WiFi sink.

One question is how a particular device selects a specific WiFi sink to join. In one arrangement, the device follows shortest path routing according to a "communications score" link metric associated with each D2D and device-to-WiFi sink route. The communications score is a function of bandwidth, power remaining, past reliability, history, and other factors associated with the source device and destination device/WiFi sink in a potential route. In another arrangement, a device chooses a WiFi sink having known favorable policies (e.g., prioritization devices having certain characteristics, an ability to allow devices to pay more for higher priority access, and the like). In still other arrangements, the device chooses a WiFi sink based on a combination of a link metric and the WiFi sink's policies.

In an alternative arrangement, the WiFi sinks may be cellular base stations or a combination of cellular base stations and WiFi hotspots.

Swarm-Based Clustered Networks

Figure 3:
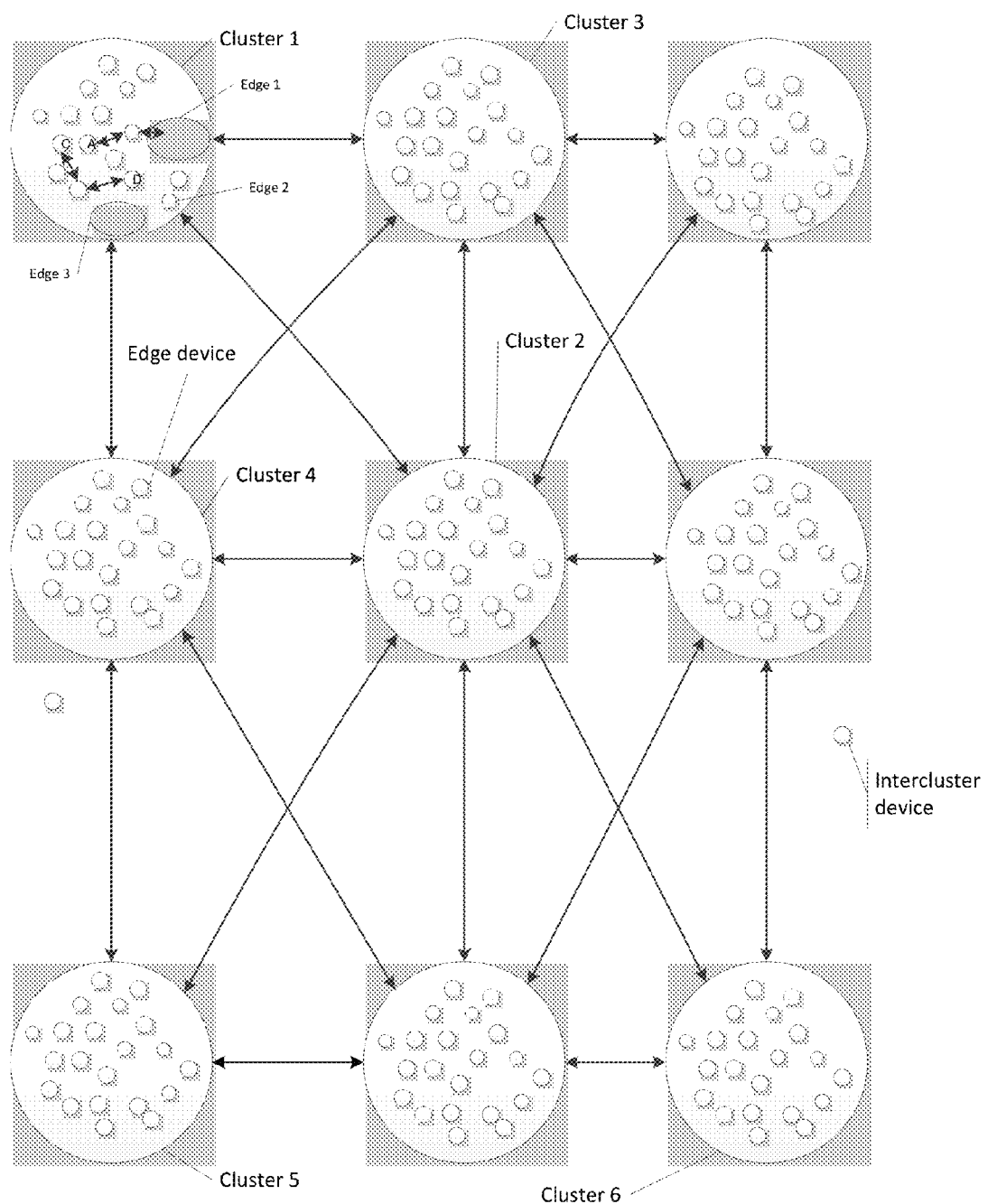
FIG. 3 is a topology for a cognitive radio network.

FIG. 3 depicts another topology for a cognitive radio network. The topology includes a number of clusters (nine are pictured in the figure), and each cluster includes a number of associated cognitive devices (e.g., cell phones, laptops, tablets, desktop computers, smartphones, smart televisions, and the like). Any two devices within a given cluster are capable of mobile-to-mobile communications, possibly by using one or more device-to-device (D2D) links. For example, within cluster #1 (upper left), device A communicates with device B using two D2D connections. Also, within cluster #1, device C communicates with device D through two D2D links.

Within each cluster, one or more devices are nominated (perhaps self-nominated) to serve as edge devices. Edge devices send and receive data to and from neighboring clusters. For example, within cluster #1, three devices (circled and labeled "Edge 1") act as edge devices and forward data to certain edge devices located in cluster #3. Two edge devices (circled and labeled "Edge 2") act as edge devices and forward data to certain edge devices in cluster #2. A single edge device (circled and labeled "Edge 3") acts as an edge node and forwards data to certain edge devices in cluster #4. The multiple edge node groups in a given cluster are logically similar to different "ports" on a router, in that they direct traffic in different downstream directions, but on a network scale. A cluster is defined as a fixed geographic space (e.g., in a city such as New York City, from $3^{rd}$ Avenue to $5^{th}$ Avenue, west-to-east, and $40^{th}$ to $50^{th}$ St south-to-north), and any device entering into that geographic space becomes associated with its corresponding cluster.

In general, clusters need not be arranged in a regularly spaced grid (despite the arrangement in FIG. 1). Clusters may be arranged in an irregularly shaped mesh topology, a partial mesh topology, a ring topology, or any other suitable topology. The connections between clusters may be wired and/or wireless. Each cluster provides data to, and receives data from, a wired Internet backbone. In one embodiment, the accessible area defines the clusters.

In one arrangement, the nomination of a device within a cluster to serve as an edge device is based on a "communications score" of the device. In an arrangement, the communications score is a numerical value that reflects the overall "fitness" of a device to act as a relay, with a higher numerical score indicating a higher fitness. The communications score of a node in the cluster may be based on its throughput, battery life (or whether it has an "infinite battery" for being plugged in to an electrical outlet), a past history of reliability, a velocity (a rapidly moving device would be an unreliable relay and is therefore assigned a lower communications score), and/or any other suitable factors.

From time to time, a given cluster may become unreachable by other clusters (e.g., a wired connection to a destination cluster may be disrupted). With reference to FIG. 3, cluster #2 may become unreachable from cluster #1. In this case, the edge nodes of cluster #1 must re-route outgoing data so that it does not pass through to the cluster #2 on the way to its destination (e.g., in cluster #6). In an arrangement, the edge nodes labeled Edge 2 in cluster #1 detect the failure of cluster #2 and re-route data to edge nodes either cluster #3 or cluster #4 for further forwarding.

Nodes are not limited to existing within a specific cluster but may be located outside a predefined cluster (either permanently or while "traveling"). For example, two "intercluster devices" are located between clusters #4 and #5 in FIG. 3. Nodes located between defined clusters can serve several functions. First, they can act as wireless relays for data in transit between the clusters that they straddle. Second, when an intercluster device eventually arrives at a new destination cluster, it can provide location/presence information to its new device mates (e.g., edge nodes in its new cluster) with respect to the devices in its former (origin) cluster. Finally, when a device arrives in a new cluster and observes a device leaving the cluster for another cluster, the newly arrived device can provide information on the communications quality in its former cluster to the departing device. This may influence the departing device's choice of a next cluster to travel to.

Cooperative Data Forwarding to a Mobile Device

Cooperative data forwarding will be described using two examples. As a first example, consider a passenger waiting in layover at an airport between flights. The passenger has a limited amount of time before boarding their next flight and wants to download a full-length movie (e.g., the Disney movie Avatar) on to their Android-enabled mobile phone to watch during the flight. While this example is discussed with respect to an Android based device, other operating systems would operate in a similar manner. The movie data file is several gigabytes in size and the passenger, whether connected directly to a cellular base station or to the airport's WiFi network, does not have sufficient bandwidth on their Android phone to download the entire movie file in the limited time available before boarding.

To download the movie file prior to boarding, the passenger must increase the effective bandwidth of his phone. To do so, he uses a mobile app on the phone to "find" other devices with available bandwidth in his vicinity. The other devices may be on the same network or on other networks as the passenger's phone. The other devices generally include cell phones, tablets, and laptops of other persons in the airport terminal and include mobile hotspots. Not all of these devices recognize the find request produced by the passenger's phone, but some do. Of the devices that do recognize the request, a fraction of the devices are willing to download portions of the Avatar movie and forward these portions to the passenger's phone using a direct mobile-to-mobile link (e.g., WiFi or Bluetooth connection) to the passenger's phone. The willing devices respond to the "find" request with their available bandwidth and, in some arrangements, a "cost" for engaging in the cooperative forwarding (i.e., downloading and forwarding data to the passenger's phone). The passenger's phone chooses one or more of the available devices and assigns to each a segment of the Avatar movie file to download.

In an alternative arrangement, the passenger's phone does not find other devices for collaboration through the use of direct "find" requests, but rather, contacts a third-party service, which may be a proxy server or some other form of database that stores information on potential collaborator's in vicinity of the passenger's phone. In one such scenario, the third party service returns a list of devices available for collaboration to the passenger's phone and the passenger's phone chooses one or more of the available devices to use for collaboration (e.g., based on costs charged by those potential collaborative phones). In another such scenario, the third party service automatically chooses a set of one or more collaborators and sends this list to the collaborator's phone. Under various implementations, the passenger's phone, third party service, and/or the collaborative devices themselves determine which segments of the Avatar movie file each phone is assigned to download.

However such assignments are determined, each selected device downloads its assigned portion of the movie file and forwards its downloaded portion of the passenger's mobile device (the passenger's mobile device may itself also download a selected portion of the movie file or may act only as a coordinator/aggregator of the portions downloaded by the other devices). The passenger's mobile collects the incoming portions of the movie and reassembles the movie file prior to boarding time. The selected devices may forward their respective portions of the movie file to the passenger's phone using a single connection (e.g., by using a Time Division Multiplexing strategy over a single WiFi connection), using multiple dedicated connections (e.g., a first selected device may perform forwarding on a Bluetooth connection to the passenger's phone, while a second selected device may perform forwarding on a WiFi connection to the passenger's phone), or through any other multiplexed or concurrent transmission technique.

In an alternative arrangement, instead of the passenger's phone assigning to each chosen device a segment of the Avatar movie file to download, a proxy server is used. In particular, the proxy server is located remotely from the airport terminal and may have a high-bandwidth connection to a source of the Avatar movie file (e.g., an Apple iTunes server). The proxy server is provided with a list of devices that will be used in collaboration to download the Avatar movie file. The list may be provided by the passenger's phone after the phone chooses one or more of the available devices or the list may be provided in combination by the passenger's phone and the one or more available devices themselves. In either case, the proxy server communicates directly with the server storing the Avatar movie file and the proxy server downloads the entire Avatar movie file from the server storing the Avatar movie file. The proxy server assigns to each device in the list a respective portion of the Avatar movie file and forwards portions of the Avatar movie file to the devices on the list according to their respective assignments. As each device on the list receives its particular portion of the Avatar movie file, it forwards this portion to the passenger's phone (if the passenger's phone is one of the devices on the list it does performing the forwarding since it has no need to). The passenger's phone collects the incoming portions of the movie file and reassembles the movie file prior to boarding time. The devices on the list may forward their respective portions of the movie file to the passenger's phone using a single connection (e.g., by using a Time Division Multiplexing strategy over a single WiFi connection), using multiple dedicated connections (e.g., a first device on the list may perform forwarding on a Bluetooth connection to the passenger's phone, while a second device on the list may perform forwarding on a WiFi connection to the passenger's phone), or through any other multiplexed or concurrent transmission technique.

As a second example, consider a subway customer located underground in a train station with an iPhone. The iPhone has an intermittent or non-existent connection to a cellular network (e.g., an AT&T 4G network) while the customer waits for an incoming train and so the passenger is unable to adequately stream episode of a television show or video to the iPhone for real-time viewing. To increase the effective bandwidth of her iPhone, the train customer "finds" a first set of devices located in her vicinity with available throughput to a cellular or network. Such devices may have more throughout than the customer's iPhone (e.g., because they are on a higher quality network or because they are located closer to the entryway of the train station) but that need not be the case. Each of the found devices in turn finds its own set of devices having connections to a network. In this way, the train customer's cell phone establishes one or more communication relay "paths" to one or more networks. Within a given relay path, the cell phone at the outer edge of the relay path has a quality connection to a server storing the episode of the television show or video and downloads a portion of the episode. This data is then forwarded along the relay path, and towards the customer's phone, one device at a time along the relay path. The connections between any two "adjacent" devices on a relay path may be a direct mobile-to-mobile WiFi connection.

The existence of even one such relay path increases the effective throughput at the train customer's phone. If multiple such relay paths are found, the effective throughput is still further increased. This increased throughput allows the train customer to stream the television show or video with sufficient throughput for uninterrupted viewing.

Figure 4:
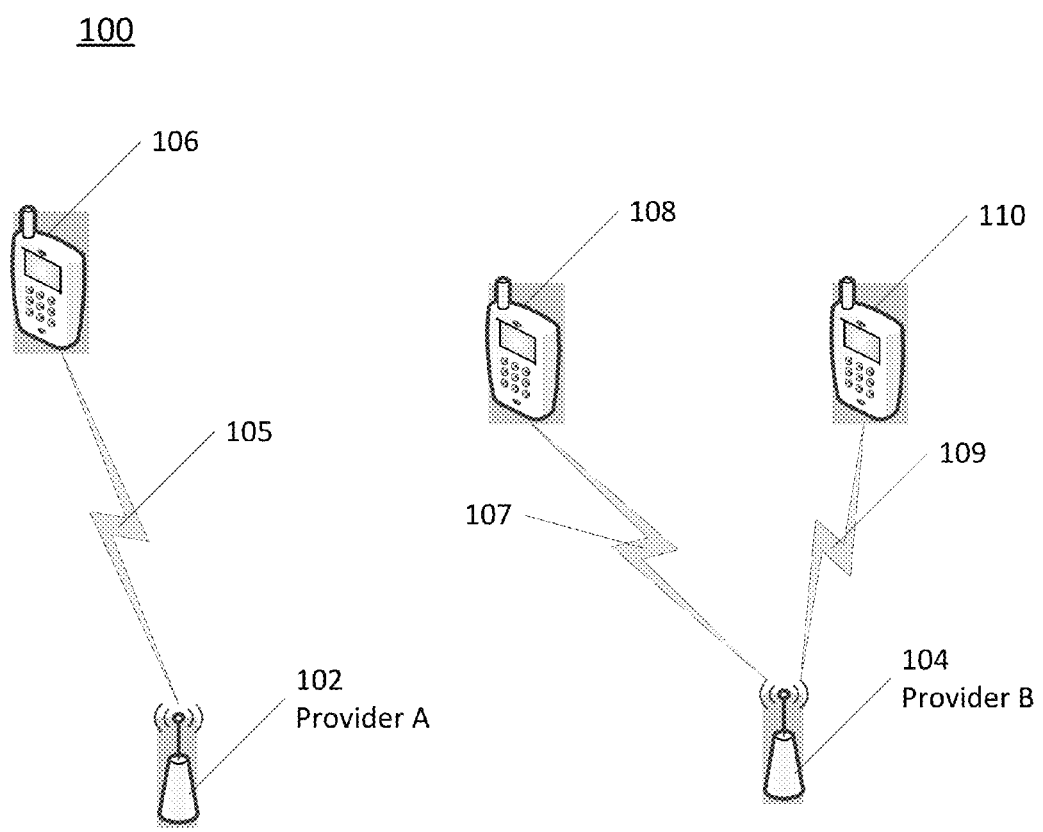
FIG. 4 depicts an illustrative portion of a communications network.

FIG. 4 depicts an illustrative portion of a communications network in accordance with an arrangement. The network 100 includes a first base station 102 operated by provider A and a second base station 104 operated by provider B. The providers A and B are generally independently operated and may use different communications protocols (e.g., provider A may use a 3G CDMA network while provider B may use a LTE network). Mobile device 106 communicates directly with the base station 102 of provider A via link 105 while mobile devices 108 and 110 communicate directly with the base station 104 using links 107 and 109, respectively, of provider B. In addition, each of the mobile devices 106, 108, and 110 is capable of forming a direct mobile-to-mobile communication link. Such a link may be based on WiFi, Bluetooth, a cognitive radio protocol, LTE Direct, another LTE-based mobile-to-mobile protocol, or any other suitable technique. Further, each of the mobile devices 106, 108, and 110 may be capable of sustaining multiple simultaneous mobile-to-mobile links (e.g., simultaneously sustaining a Bluetooth connection to a first mobile device and a WiFi connection to either the first mobile device or a second mobile device). In one arrangement, each mobile-to-mobile link operates on a dedicated frequency band. Although not required, it is generally the case that each mobile-to-mobile link has a significantly faster bandwidth than links 105, 107, and 109.

In one arrangement, first mobile device 106 determines all of the collaborating devices 108, 110 and assigns portions of the file to be downloaded to each of the collaborating devices 108, 110. The assignment of a portion of the file to be downloaded to one of the collaborating devices 108, 110 includes an addressing scheme for delivery and assembling of the packets by the device 106.

The following specific scenario will be used to illustrate the general techniques described herein. Suppose the mobile device 106 initially requests to download a data file through its direct link to its provider A via the link 105. Suppose further that the link 105 typically does not provide adequate bandwidth (either objectively or as determined by the user of the mobile terminal 106) for the full download. In this case, the mobile device 106 engages in a cooperative forwarding strategy with the mobile devices 108 and 110, whereby the mobile devices 108 and 110 each download portions of the requested data file from their own networks (i.e., provider B via the links 107 and 109, respectively) and forward their download portions to the mobile device 106.

In one arrangement, device 106 communicates with the collaborating devices 108, 110 over an available communication mode such as WiFi (IEEE 802.11), Bluetooth, or another available communication mode. In one arrangement, an IR port or an internal GPS antenna is repurposed for this communication. In this way, the device 106 can receive a portion of the file via provider A using its own cellular connection and the remainder of the file from the collaborating devices 108, 110 via another available communication mode.

In one arrangement, device 106 has all of its communication modes active. In this manner, device 106 can maximize packet reception from the collaborating devices 108, 110 by providing multiple paths to receive data.

In one arrangement, device 106 has limited ones of its communication modes active. For example, device 106 can us a collaboration mode only and disable its cellular connection to minimize data usage or overage charges for data.

In one arrangement, device 106 establishes a time-division multiplexed (TDM) network to receive data from the collaborating devices 108, 110. Device 106 assigns time slots to each of the collaborating devices 108, 110 to receive the data. If one of the collaborating devices 108, 110 has a lower cost or greater throughput, device 106 may assign a wider slot or multiple time slots to that device.

Figure 5:
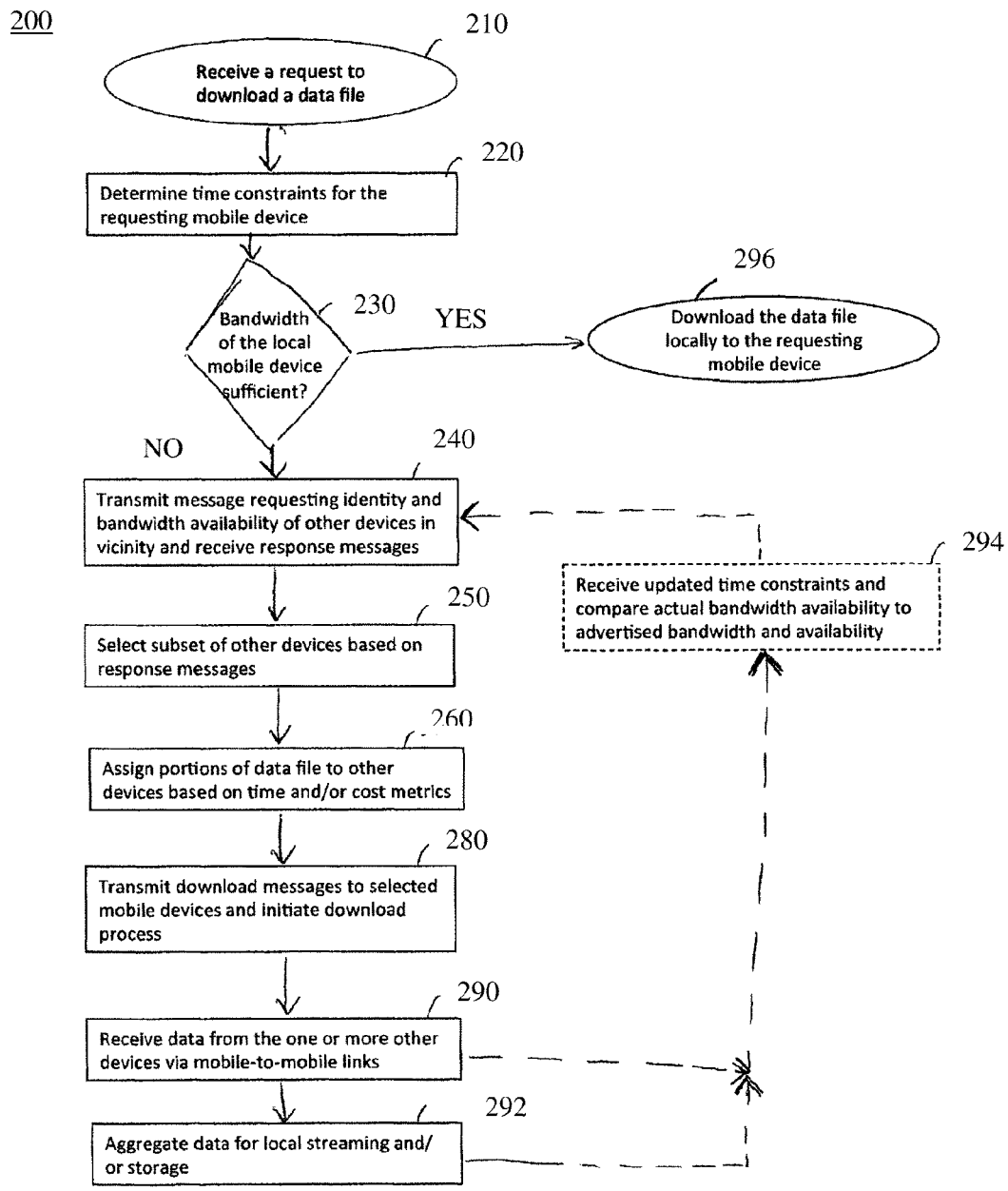
FIG. 5 is a flowchart for an assignment strategy.

FIG. 5 depicts an illustrative process 200 by which a mobile device negotiates with other devices in its communications vicinity to download and forward portions of a data file desired by the mobile device. For illustrative purposes, suppose that the mobile device is the mobile device 106 of FIG. 4 operating in the communications environment depicted in FIG. 4. At 210, the mobile device 106 receives a request to download a data file. The requested data file may be a full-length movie, a video clip, a music file, an upgrade for a software application installed on the mobile device 106, or a patch/upgrade for an operating system of the mobile device 106. A user of the mobile device 106 may make the request (e.g., the user may tap on a series of screens in a mobile marketplace such as an iTunes-type marketplace and select to download a movie directly onto the mobile device 106) or the request may be initiated automatically through a pre-defined schedule or through a push notification (e.g., an weather application installed on the mobile device 106 may determine that an upgrade is available and request a download of the upgrade).

At 220, the mobile device 106 determines time constraints for downloading the requested file. The mobile device 106 may make this determination of available time in a number of ways. In an arrangement, the mobile device 106 prompts the user for an amount of time available to download the file (e.g., 10 minutes). The amount of time available may be based on a hard cutoff after which the network will become unavailable (e.g., when the user is about to board a plane) or it may be based on a simple preference of the user to have the downloaded file available in a short period of time. In another arrangement, the mobile device 106 accesses calendar software installed on itself or travel/itinerary/flight schedule information stored on itself to determine how much time remains before its connection to provider A becomes intermittent or non-existent. For example, the mobile device may determine at 220 that it has 10 minutes in which to download the movie.

At 230, the mobile device 106 determines whether its locally available bandwidth is sufficient to download the data file requested at 210. To do, the mobile device 106 compares bandwidth on the link 105 (estimated and/or actually measured) and the time constraints determined at 220. The mobile device determines if there is sufficient time within the time constraints to download the data file taking into account a sufficient margin for unknown future bandwidth slowdowns and/or fluctuations. If it is determined that the local bandwidth is sufficient at 230, then the process 200 proceeds to step 296, where the mobile device 106 downloads the data file without engaging the cooperation of any other device. If, on the other hand, if it is determined that the local bandwidth is not sufficient at 230, the process 200 proceeds to 240.

At 240, the mobile device 106 pings other devices (e.g., other mobile devices and/or mobile hotspots) in its vicinity to see if they are available to cooperate with the mobile device 106 to download the requested data file. In particular, the mobile device 106 transmits a message (which may be either broadcast or targeted) requesting an identity and bandwidth availability of these devices. In general, not all of the devices in the vicinity of the mobile device 106 will be configured and/or willing to response to such a query. For example, in one arrangement, only devices having a particular mobile application installed will be able to recognize and response to such a query. In another arrangement, only devices on the same provider network as the mobile device 106 will be able to respond to such a query. Also, at 240, the mobile device 106 receives response messages from participating devices in its vicinity. The response message delivered by each device includes an indication of the bandwidth that the device can provide to the mobile device 106. Using the mobile device 108 as an example of a cooperative device, the indicated bandwidth may be the bandwidth of the link 107, an indication of the mobile-to-mobile bandwidth between the device 108 and the mobile device 106, and/or a end-to-end total bandwidth increase that the mobile device 106 will increase if it elects to engage the mobile device 108 in cooperative forwarding. In an alternative arrangement, the mobile device 106 sends instructions to a proxy server or one or more third party servers to ping other devices (e.g., other mobile devices and/or mobile hotspots) in the vicinity of the mobile device 106 to see if those other devices are available to cooperate with the mobile device 106 to download the requested data file.

At 250, the mobile device 106 selects a subset of devices that delivered response messages at 240 based on the contents of their response messages. The mobile device 106 selects a subset to ensure enough aggregate bandwidth so that the mobile device 106 can download the requested file within the time constraints specified at 220. Additionally or alternatively, the mobile device 106 selects a subset of other devices based on a "cost" charged by the other devices for their cooperation in data forwarding. There term "cost" is used in the general sense herein and may refer to a dollar value (e.g., $0.30/MB), a digital currency value such as a Bitcoin value, or any other form of suitable type of currency or cost metric).

At 260, the mobile device 106 assigns portions (or segments) of the data file for downloading and forwarding to each of the subset of devices selected at 250. For the purposes of illustration only, consider that the mobile device 106 selects the mobile devices 108 and 110 for cooperative forwarding at 250. The mobile device 106 may assign portions of the data file to all devices (i.e., to itself and to mobile devices 108 and 110) or only to the cooperative devices that it selected at 250 (i.e., to mobile devices 108 and 110 but not to itself). FIG. 3 and the related discussion illustrate particular assignment strategies that may be employed by the mobile device 106 for both streaming and non-streaming (i.e., downloading) modes in accordance with some arrangements.

In an alternative arrangement of 260, instead of the mobile device 106 assigning portions of the data file, a proxy server is used. In particular, the proxy server is located remotely from the mobile device 106 and has a high-bandwidth connection to a source of the data file (e.g., an Apple iTunes server). The proxy server is provided with a list of devices that will be used in collaboration to download the data file. The mobile device 106 may provide the list after the mobile device 106 chooses one or more of the available devices, the list may be provided in combination by the mobile device 106 and the devices on the list themselves, or the proxy server may itself maintain such a listing independent of the request mobile device 106 (e.g., the proxy server may regularly download information of mobile terminals available to collaborate in a given area (e.g., based on GPS coordinates) from a third party service or from information generally supplied by certain types of mobile devices). In any of these cases, the proxy server communicates directly with the server storing the data file and the proxy server downloads the entire data file from the server storing the data file. The proxy server assigns to each device in the list a respective portion of the data file and forwards portions of the data file to the devices on the list according to their respective assignments. As each device on the list receives its particular portion of the data file, it forwards this portion to the mobile device 106 (if the mobile device 106 is one of the devices on the list it does performing the forwarding since it has no need to). The mobile device 106 collects the incoming portions of the data file and reassembles the data file. The devices on the list may forward their respective portions of the data file to the mobile device 106 using a single connection (e.g., by using a Time Division Multiplexing strategy over a single WiFi connection), using multiple dedicated connections (e.g., a first device on the list may perform forwarding on a Bluetooth connection to the passenger's phone, while a second device on the list may perform forwarding on a WiFi connection to the passenger's phone), or through any other multiplexed or concurrent transmission technique.

With continued reference to FIG. 5, at 280 the mobile device or the proxy server transmits download messages to each of the mobile devices selected for cooperation at 250. For example, continuing with the illustrative example, the mobile device 106 sends download messages to the mobile devices 108 and 110 at 280. The download message sent to a given cooperative mobile device (e.g., the mobile device 108) specifies the portions of the file that the cooperative mobile device is to download (e.g., for the mobile device 108 may be instructed to download portions of a movie file corresponding to 20:00 to 45:00 of runtime, while the mobile device 110 may be instructed to download the portion of the move file corresponding to 45:01 to 1:10:00 of runtime). The download message sent to a given cooperative mobile device also authorizes the cooperative mobile device to begin the download its respective portion (and, in applicable cases, to charge or debit the mobile device 106 according to a relevant cost metric).

At 290, the mobile device 106 receives data from the cooperative mobile devices selected during the most recent iteration of 250 via a mobile-to-mobile link. For example, continuing the example, the mobile device 106 receives data downloaded and forwarded from each of the mobile devices 108 and 110.

At 292, the mobile device 106 aggregates and concatenates the various streams of data received from cooperative devices at 290 to form a single stream of data (identical to the stream that would have been received had the mobile device 106 singly downloaded the data stream without cooperation) and, depending on the application, streams the aggregated and concatenated data on the mobile device screen and/or stores the aggregated and concatenated data.

The process 200 optionally includes an adaptive control to monitor and a number and/or identity of cooperative device(s) used to download a data file. In particular, in an arrangement, the process 200 proceeds from 290 and/or 292 at certain time instances to 294. At 294, the mobile device 106 reevaluates the mobile devices enlisted for cooperative forwarding during a last execution of 250. In an arrangement, the mobile device 106 compares an amount of data not-yet-received in the data file with a remaining amount of time under the time constraint determined at 220 (or an updated time constraint). If the data file is not on track to be fully downloaded within the time constraint, the mobile device 106 may enlist one or more additional cooperative devices by returning to step 240 (while still continuing to receive data from the current set of cooperative mobile terminals). Additionally or alternatively, the mobile device 106 may remove one or more devices previously enlisted for cooperation (and, in applicable cases, may request a refund of any payments paid to that device for cooperative forwarding). For example, in an arrangement, the mobile device 106 removes a device from cooperative forwarding if the actual mobile-to-mobile link bandwidth with that device falls sufficiently below an amount of bandwidth advertised by the device at 240.

Figure 6:
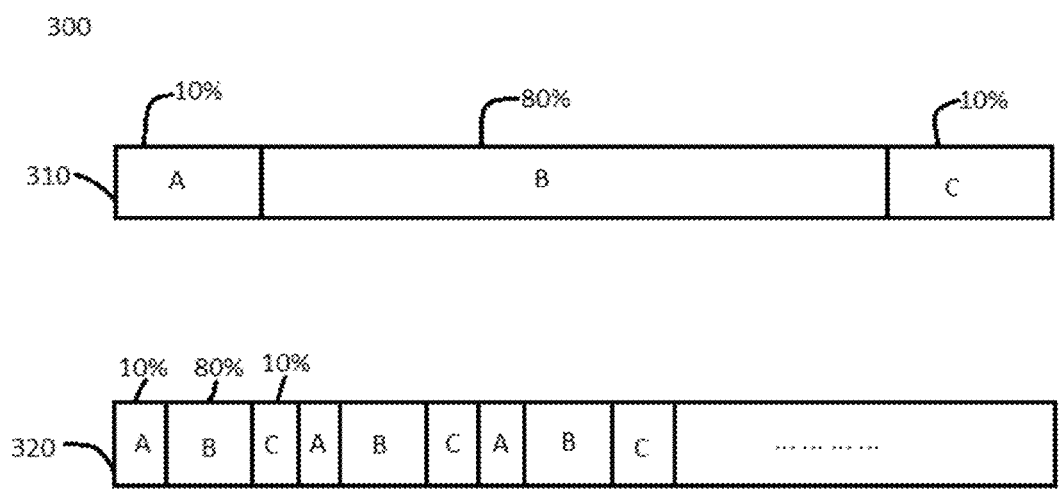
FIG. 6 illustrates an assignment strategy.

FIG. 6 illustrates particular assignment strategies that may be employed by a mobile device for both streaming and non-streaming (download) modes in accordance with some arrangements. In continuing with the illustrative scenario used above, FIG. 6 graphically depicts portions of a data file assigned for download to each of the mobile terminal 106 ("A") and its cooperating mobile terminal 108 ("B") and 110 ("C") in accordance with arrangements.

The allocation 310 may be used when the data file that is requested at 210 is to be downloaded and stored for later use by the mobile device 106 (as opposed to being streamed). As depicted in the figure, the mobile terminal 108 ("B") is responsible for downloading a largest portion (80%) of the data file while mobile terminals 106 ("A") and 110 ("C") are responsible for downloading smaller portions (10% each) of the data file. This allocation is based on the bandwidth and/or cost advertised by the mobile terminal 108 at 240. For example, the fact that mobile terminal 108 is responsible for such a large portion (80%) of the download may be predominately due to the mobile terminal 108 having the highest advertised throughput, the lowest advertised cost, or a combination of these factors.

The allocation 320 may be used when the data file that is requested at 210 is to be streamed for display on the mobile device 106. In this case, the mobile terminal 108 ("B") is still responsible for downloading 80% of the data file while mobile terminals 106 ("A") and 110 ("C") are still responsible for downloading 10% of the data file each. However, the data file is broken into a larger number of segments. While creating more such "intervals" involves more overhead processing, this allocation strategy allows contiguous portions of the data file to be aggregated with less delay at the mobile terminal 106 and therefore the allocation 320 may be better suited to streaming and/or real-time data applications than the allocation 310.

Figure 7:
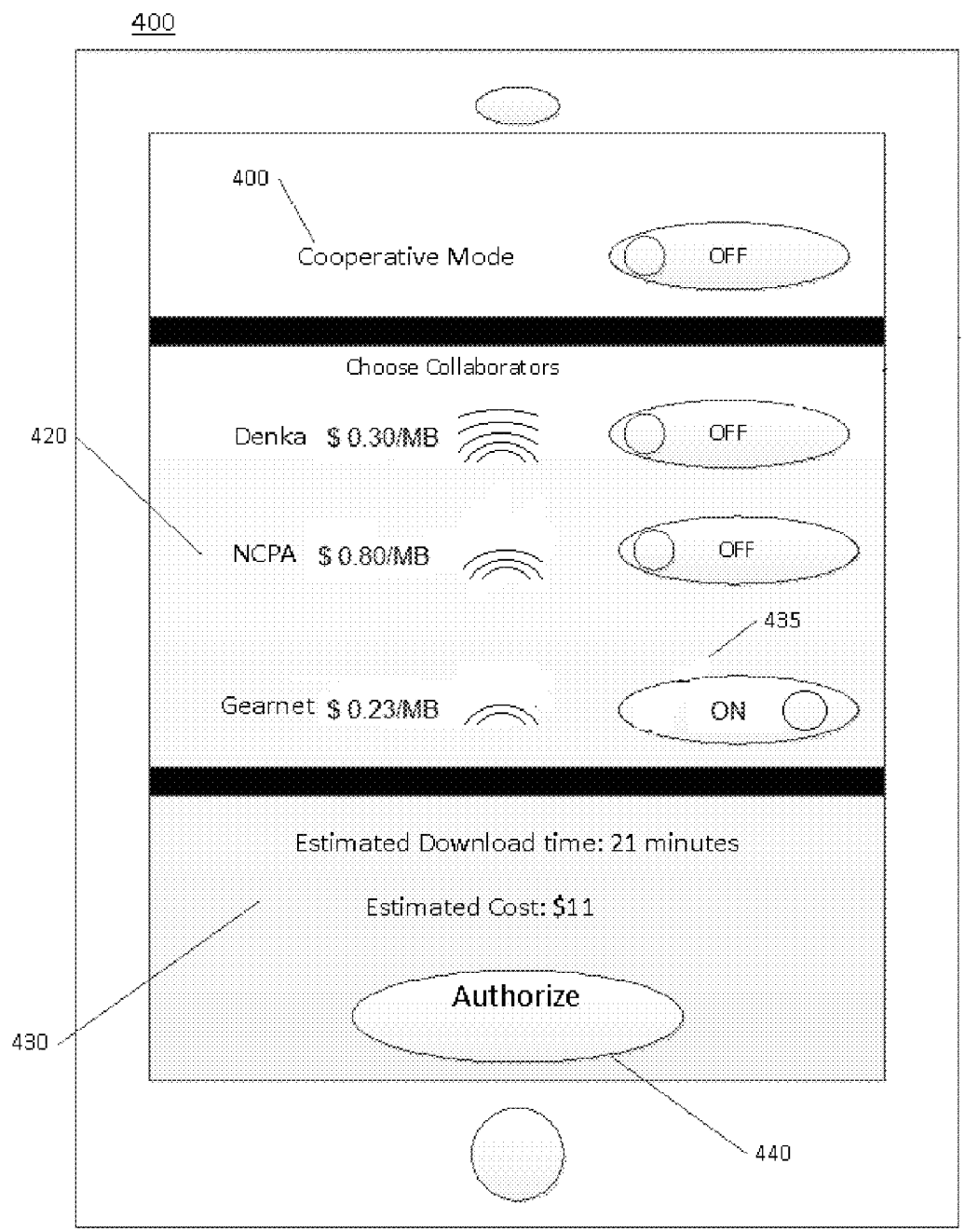
FIG. 7 is a device utilizing the communication network.

FIG. 7 illustrates an interactive menu used by a user of a mobile device to set parameters of cooperative forwarding in accordance with an arrangement. The menu 106 may be displayed on an Android-enabled, iPhone type device, or any other suitable type of device. Using the toggle selection located in screen region 410, a user may turn on or off cooperative mode. In an arrangement, turning off the cooperative mode not only ensures that the user's mobile device does not enlist other device as cooperative nodes but also makes the user's device invisible (non-cooperative) with respect to queries made by other nodes for cooperation.

If the cooperative mode is enabled, a list of potential cooperating devices is displayed at area 420. For example, FIG. 7 shows a case where three potential cooperating devices provide response messages at 240 (FIG. 5). The devices have labels "DENKA," "NCPA," and "GEARNET." The amount of bandwidth advertised by each of these potential collaborating devices is presented as a series of bars. In particular, DENKA, at four bars, advertises the most bandwidth, while GEARNET, at two bears, advertises the least amount of bandwidth. Further, each potential collaborating device advertises a cost per MB to be charged to the requesting mobile (i.e., the mobile device 106 in the illustrative scenario described above). In the example, DENKA charges $0.30/MB for collaboration while NCPA charges $0.80/MB for collaboration and GEARNET charges $0.23/MB for collaboration. In other words, each user sets the rate they charge for collaborating. Any combination of available devices may be tentatively selected for collaboration using the on and off toggles located in area 435. The selection can be to maximize throughput, minimize cost, or a combination of both.

At area 430, an estimated download time for the file requested at 210 (FIG. 5) and an associated estimated cost for downloading the file are displayed. The values displayed at area 440 are based on the networks (tentatively) enabled or disabled using the toggles located in area 435. As such, a user may test different combinations of cooperative devices to find a desirable tradeoff between estimated download time and estimated cost without finalizing his or her decision. To finalize the decision, the user taps or otherwise selects the authorize button located at area 440. Once the authorize button is tapped, download messages are transmitted to the collaborators selected in the area 420 to begin the download and forwarding collaborative process.

Although not depicted, a user can access a screen similar or identical to that of FIG. 7 once downloading has started in order to add new cooperative devices and/or remove existing cooperative devices. Further, the user can view a current estimated download time and estimated cost in the area 430 once downloading begins as this information is continually updated during the downloading process.

As would be understood by one of ordinary skill, based on the disclosure and teachings herein, the concepts presented herein are illustrative and many generalizations or alternatives may be implemented without departing from the scope of the present disclosure. For example, a debt or payment system other than conventional currency (e.g., dollars) may be used by mobiles in deciding whether to cooperate with each other. In an arrangement, Bitcoins are used as "currency" is transacted between and among mobile nodes. In another arrangement, a bandwidth capital scheme is used as "currency." In this scheme, a user builds acquires currency by acting as a cooperative forwarder at certain instants of time and spends currency by enlisting other devices to cooperatively forward data to it at other instants of time.

As would be understood by one of ordinary skill, based on the disclosure and teachings herein, the collaborative devices may be mobile hotspots, e.g., listed in the area 435 of FIG. 7, cell phones, tablets, laptops, wired computers, and/or any other suitable type of device with network access.

As would be understood by one of ordinary skill, based on the disclosure and teachings herein, the collaborative techniques described herein may be used to upload a file in addition or instead of to download a file.

As would be understood by one of ordinary skill, based on the disclosure and teachings herein, at least some of the potential collaborating devices may not have a direct mobile-to-mobile link with the requesting mobile device, but may instead connect to the requesting mobile device through one or more intermediary mobile devices. For example, a collaborator A may have a mobile-to-mobile link (e.g., a WiFi link) with a mobile device intermediary B, and the mobile device intermediary B may have a direct mobile-to-mobile link with the requesting mobile device. In this scenario, the mobile device B may assess a bandwidth that it can provide to the requesting mobile device based on its own ability to collaborate and/or its connection with the mobile device A and advertise this "net" amount of bandwidth to the requesting mobile device. If the requesting device elects to collaborate with the mobile device A then data is forwarded to the requesting device via the mobile device B.

Cooperative Data Forwarding, CDNs, and P2P File Sharing Networks

A Content Delivery Network ("CDN") replicates data that exists at a single server and makes the data available at one or more other servers ("mirrors") located over a wide geographic region (e.g., the United States or the world). As such, CDNs generally improve the experience of a user accessing the Internet by preloading data on a large number of mirrors so that the data can be fed from a high-quality mirror when the data is requested. For example, a retail store such as Gap may partner with a CDN provider such as Akamai Technologies to provide replicated copies of the images (e.g., JPG or BMP images) on the Gap.com website on mirrors located around the world. When a customer selects to view an image on the Gap.com website in their web browser, the image is provider to the customer from a "best" mirror site rather than directly from the Gap.com website.

The determination of which mirror is "best" may be based on the geographically closest Gap.com mirror to the customer, the relative congestion level of the various mirrors, or on any other suitable criterion/criteria. Advantages of CDN include faster load times for the user, fewer dropped packets, redundancy to combat single server failure (e.g., due to a natural disaster), and scalability with an increasing visitor demand. Peer-to-peer (P2P) file sharing networks provide distributed access to data files. When a given user node of the network desires a file, it pings the network to determine other nodes of the network that have copies of the file available. The given user node then downloads the entire file from one available node or, more commonly, portions of the file from a number of the available nodes (the portions are then assembled at the given user node to re-create the entire file contents).

Some distinguishing features of the disclosed systems, methods, and techniques as compared to typical CDN and P2P file sharing networks are now discussed. First, CDN and P2P file sharing networks deal with large-scale network deployment issues to address "fairness" for all users of the network. In contrast, the disclosed systems, methods, and techniques "selfishly" prioritize preferences of a single end-user and are intended to provide as much throughput to an end-user as the end-user selects (and, in some arrangements, can "afford"). Second, CDN and P2P file sharing networks are "proactive" in that data is preloaded at intermediary nodes prior to a request of a given end-user for portions of the data from those nodes. In contrast, in the disclosed systems, methods, and techniques, data can be provided to an intermediary node only after an end-user specifically requests the given data (i.e., whether the intermediary node had a local copy of the file prior to receiving the end-user's request for the file is immaterial).

The disclosed systems, methods, and techniques are further distinguished in that bandwidth constraints may be determined based on internal processes unique to a user's mobile device, e.g., using calendar information accessible via the mobile device. Further, the disclosed systems, methods, and techniques involve, in some arrangements, an explicit economic exchange between nodes whereby a given node pays, in some suitable "currency," for the throughput provided by other nodes on a byte-by-byte basis and/or receive a refund if a bandwidth advertised by a particular collaborator device falls short of actual bandwidth. Further, the disclosed systems, methods, and techniques relate to a scheme where the end-user node is technically capable of retrieving the desired file by itself and without the participation of any collaborative intermediary nodes and uses the collaborative intermediary nodes only to speed the acquisition of the data.

Figure 8:
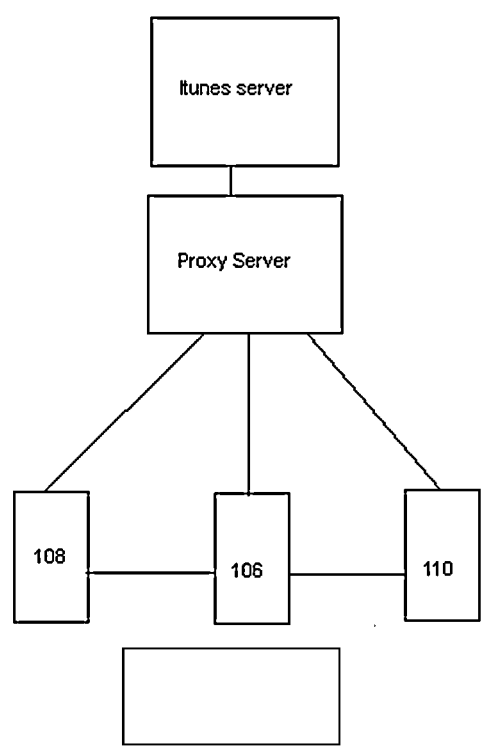
FIG. 8 is a content delivery network.

As shown in FIG. 8, a device 106 connects to a service, such as itunes, via a proxy server. Like the arrangement discussed above, device 106 engages the collaborating devices 108, 110 to download a file. All of the devices connect through the proxy server. In one arrangement, the proxy server determines the manner in which the file is divided. The proxy server divides the file to be delivered into its constituent parts and delivers them to device 106 and the collaborating devices 108, 110. The collaborating devices 108, 110 deliver the file portions they receive to device 106.

While the proxy server typically determined how a file is divided and delivered to each device, the device 106 can also perform this task.

In one arrangement, the device 106 requests the file and it is delivered, in its entirety to the proxy server. The proxy server then divides and delivers the file. In this manner, the original provider, such as itunes, is unaware of multiple paths being used to deliver the file and is not accessed by multiple devices to obtain the single file.

Predictive Access Point and User Location Using a Cognitive Radio

Predictive access point location will initially be described using an illustrative example. Consider a user walking down a Manhattan sidewalk on a weekday at 2 pm. The user wants to stream music to his phone and a music application on the user's phone requests access to the Internet so that it can retrieve a corresponding data stream. The user's phone or other device can connect to the Internet using one of two types of connections. First, the user's phone can connect to the Internet, and stream the requested music, via a "primary" wireless connection from the phone to the user's cell phone service provider. For example, if the phone is an iPhone on the AT&T network, the user's phone can connect directly to an AT&T cellular base station and stream the requested music.

Alternatively, the user's phone can establish a potentially higher-speed mobile-to-mobile "secondary" connection to the Internet. In contrast to the primary connection, the secondary connection is capable of connecting directly to a second mobile device that happens to be in proximity to the user's mobile device or to an Internet hotspot (e.g., a WiFi connection) local to the user's mobile device. When the secondary connection is not made directly to a local Internet hotspot, it will generally be formed across one or more mobile-to-mobile hops over other mobile devices leading from the user's phone to an Internet gateway. The Internet gateway may be a cellular base station but it need not be. The Internet gateway could also be a mobile hotspot located in proximity of the user's cell phone or any other suitable Internet gateway.

In predictive access point location, the user's mobile device establishes it mobile-to-mobile hops using a statistical knowledge of other mobile devices located in its vicinity. The devices providing the links to the device are not based on a typical neighbor discovery process but rather are based on statistical knowledge of other devices that are likely to be in vicinity of the user's device at the time that it makes a request for Internet access. Such statistical knowledge is based on the geographic location of the user's device, the calendar date, and/or the time of day when the request is made. In predictive access point location, the user's cell phone first attempts to establish a connection to the data network using one or more mobile-to-mobile links created through its secondary connection and uses it primary connection only as a backup (or "last resort") connection.

The advantages of using a secondary connection are potentially many-fold. First, communications along the secondary connection will generally use less power than communications along the primary connection (the secondary connection involves one or more hops of a much smaller distance to its network access point than the primary connection). The secondary connection will also generally provide a greater throughput to the user and, because it is a lower power connection, cause less interference to other wireless devices in the area. In one arrangement, the user goes hop-to hop to collaborators instead of connecting to the cellular network.

In one arrangement, the network or a third party provider is used to determine your location. The network provides a list of available collaborators based on the device location. Other factors may include travel speed and direction of travel of the target device and/or potential collaborators.

In one arrangement, historical or collated data is used to predict potential collaborators along a route. In this manner, data can be provided to an access point/collaborator the user will be able to access.

In one arrangement, the user pings the network to determine potential collaborators. In one arrangement, the user device is provided with a list of predicted collaborators. The prediction is based on such factors as location, time of day, day of week, and the like. The user device then goes through the list of predicted collaborators serially until a connection is made. Alternatively, the user goes through the list in a random order or based on other criteria such as available bandwidth, cost, connection quality, or the like.

Figure 9:
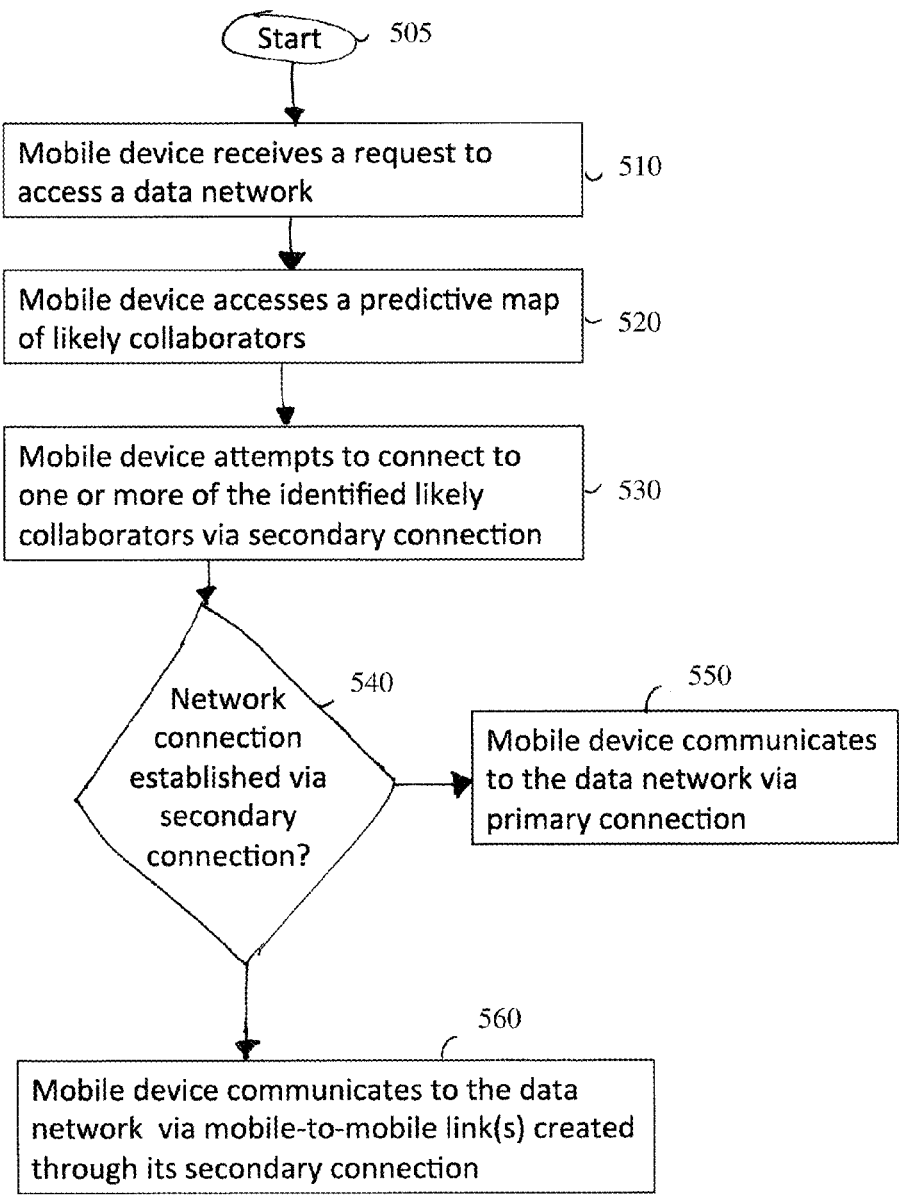
FIG. 9 is a flowchart for a content delivery network.

FIG. 9 illustrates a process used by a mobile device to perform predictive access point location in accordance with arrangements. The mobile device may be a cell phone, laptop, tablet computer, portable digital assistant (PDA), or any other portable wireless device. The mobile device has a "primary" one-hop wireless connection directly to a data network provider (e.g., directly to cell tower) and at least one "secondary" wireless connection to other mobile terminals and/or local network hotspots. The secondary wireless connection is a connection capable of communicating directly to other mobile devices and may be a WiFi connection. Generally, communications over the primary connection requires a large amount of power, causes a large amount of interference to other devices, and provides a lower throughput when compared to communications over the secondary connection.

At 505, process 500 begins. At 510, a user's mobile device receives a request to access a data network. The request may be in response to a direct user selection on the mobile device or may be generated automatically by the mobile device (e.g., request may be a regularly generated search for software updates).

At 520, the mobile device seeks to avoid use of its primary wireless connection and instead to establish a secondary connection to a data network access point. In particular, the mobile device accesses a predictive mapping (e.g., listing) of other mobile devices and access points "likely" to be in its communications vicinity. The predictive mapping may be stored in a database maintained by the user's cell phone network provider or a trusted third party. In either case, this database may be based on aggregated information collected through willing participation of other mobile device users (e.g., in one arrangement, only devices that have shared their own position information with the database gain access to the database). The data stored in the database may be determined from data normally tracked by network providers provided that user's have not opted out of providing such information. While the database contains statistical and not exact information on mobile devices and access points located in a given area at a time day and time, such information may generally be highly predictive. For example, on a given workday in an urban area, mobile devices of employees working in a given office building will predictably be located at the office building.

There are at least two ways in which the predictive mapping may be provided to the mobile device so that it can be accessed by the mobile device. In a first arrangement, the mobile device automatically connects via its primary connection (if no secondary connection to a data network has yet been established) or its secondary connection (if such a connection to a data network has been established) to the database at regular intervals and provides its current physical location. The database then provides the mobile device with the predictive mapping for the location and based on the calendar day and the time of day. In a second arrangement, such a connection is made only in response to a data access request by the mobile device.

At 530, the mobile device attempts establish a connection to a local access point. The connection may be direct (if the access point is identified in the predictive mapping) or through one or more mobile-to-mobile links, where the first link is from the mobile device to a secondary device identified in the predictive mapping. In one arrangement, the mobile device starts by sequentially attempting to connect to devices listed in the predictive mapping until a connection with one of the devices ("first collaborator") is established. If the first collaborator is an access point (e.g., WiFi hotspot) then a connection is established. On the other hand, if the first collaborator is another mobile device then a connection to the local access point will only exist if the first collaborator itself is connected to the local access point. In some arrangements, the first collaborator also uses the predictive mapping technique resulting in an iterative "route finding" algorithm to the local access point.

At 540, the mobile device determines whether a network connection has been established via its secondary connection. If so, the process 500 proceeds to 560, where the mobile device communicates to the data network via one or more mobile-to-mobile links established through the secondary connection. On the other hand, if the mobile device determines at 540 that a network connection has not been established via the secondary connection, it reverts to its primary connection. In particular, the process 500 continues to 550, where the mobile device communicates to the data network via its primary network connection. The determination at 540 may be determined based on a predefined number of mobile devices from the predictive mapping for which a connection should be attempted and/or based on a timeout value, after which attempts to connection via the secondary connection are terminated.

In another arrangement, the database manager (whether a trusted third party or a cell provider) can similarly predict the geographic location, or "routes," of a customer and the type of content that will be requested by the customer while traversing the predicted routes. For example, suppose the cell phone provider or database manager learns through user-authorized monitoring that a given customer, John Doe, travels from his home address in the Upper West Side of Manhattan to his work address in Midtown most weekdays between 8:30 and 9 am. Further, suppose that the cell phone provider learns that the customer has been watching episodes of Arrested Development in sequence on each weekday trip. The service provider can provider this information to a partner CDN so that the next episode of Arrested Development is preloaded and stored at local hotspots that the customer will encounter on his (likely) next morning commute to work. If the customer does indeed traverse the predicted route and request the next episode of Arrested Development, the customer will experience a smoother and higher quality connection to the requested episode. If the customer does not traverse the route according to the prediction, the data may be stored at this local hotspot in anticipation the customer returning the next morning to his normal routine. On the other hand, if the service provider learns that the customer watched the predicted episode (say, episode 20) but along an irregular route, the service provider may enable the CDN to provide the next episode, episode 21, to local hotspots located both along the customer's normal route and the irregular route in the next morning.

As would be understood by one of ordinary skill in the art, the disclosed systems, methods, and techniques can be applied to regions much larger than that of Manhattan and to technologies other than access hotspots. For example, the same preloading of data can be performed along cellular communications towers located along a 60-mile stretch of highway frequented by a customer who travels on his typical workday morning commute from Wilmington, Del. to Baltimore, Md.

Rewarding Silence in Spectrum Allocation

Figure 10:
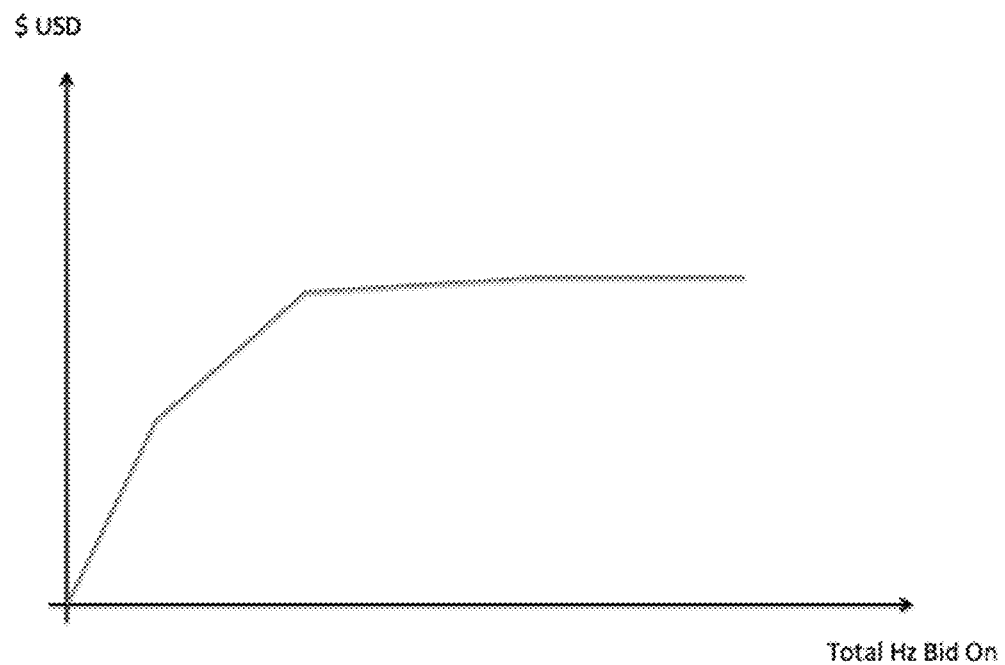
FIG. 10 is a bandwidth-cost curve.

In a scenario in which a set of N cognitive radios is located in a confined geographic area (e.g., an office building or a confined outdoor area such as a park), each bids for access to limited spectrum. In general, each cognitive radio maintains a bandwidth-cost curve, which specifies how much the cognitive radio is willing to pay to access a given amount of spectrum. An illustrative bandwidth cost curve is depicted in FIG. 10.

The x-axis denotes a total bandwidth bid on (in Hertz, denoted "Hz") and the y-axis denotes a maximum bid that the cognitive radio is willing to pay as a function of the total bandwidth bid on. Thus, this particular curve reflects a situation in which initial bandwidth is most valuable: As the cognitive bids on more bandwidth, the cost per Hertz that the cognitive radio is willing to pay trends downward. This is reflected in the concave shape of the curve above. In general, a particular cognitive radio may have any cost curve, whether concave in the Total Hz Bid On or not.

According to the specified systems, methods, and techniques, spectrum is allocated to the N cognitive radios as follows. First, all the cognitive radios exchange their cost curves with each other simultaneously (in the logical sense if not literally in the time instant sense). This may be accomplished by encrypting the data using a private key, exchanging cost curves in encrypted form using the private key, and then globally releasing the private key to all cognitive radios.

Once the key is released, a subset of the N cognitive radios will be assigned bandwidth based on their bids and, in general, a subset of the N cognitive radios will not be assigned any bandwidth as their bids are insufficient. In an arrangement, bandwidth is allocated to maximize the "revenue" collected from all participants during the auction. As would be understood by one of ordinary skill in the art, based on the disclose and teachings herein, various well-known optimization techniques may be used to determine the specific bandwidth allocated to each cognitive radio (if any) depending on characteristics of the bandwidth-cost curves. For example, as would be understood by one of ordinary skill in the art, based on the disclosure and teachings herein, the Kuhn-Tucker conditions, or their equivalent, may be used to determine the revenue-maximizing bandwidth allocations when the bandwidth-cost curves are concave shaped in Bandwidth Bid On parameter.

In one embodiment, cognitive radios 1 through P are assigned bandwidth (these cognitive radios will be referred to as "active cognitives"). These radios pay into a pool based on their assigned bandwidth and their cost curves. Suppose that the total amount paid into the pool is S dollars (as would be understood by one of ordinary skill in the art, any suitable "currency" may be used, whether based on a monetary system or not). Suppose that cognitive radios P+1 through N are not assigned any bandwidth through the bidding process (these cognitive radios will be referred to as "inactive cognitives").

Given the assumptions above, a central question is how to incentivize inactive cognitives, i.e., the losers in the auction process, to "respect" the auction results, that is, not engage in impermissible interfering transmissions among the active cognitives. (Active cognitives are incentivized to respect the rules of the auction because they have won the right to communicate over the spectrum according to the auction results.) According to the disclosed systems, methods, and techniques, the inactive cognitives are paid money from the pool of S dollars in proportion to their unfulfilled bids for spectrum.

For example, take a simple case where there are only two inactive cognitives. Suppose that spectrum was twice as valuable to the first inactive cognitive as compared to the second inactive cognitive (i.e., that the cost curve for the first inactive cognitive is exactly twice the cost curve for the second inactive cognitive). In this case, the first cognitive will be paid 2S/3 dollars from the pool, while the second cognitive will be paid the remaining S/3 dollars from the pool. Thus, the first inactive cognitive radio is paid twice as much as the second inactive cognitive radio reflecting that the spectrum was worth twice as much to the first cognitive radio. Thus, the lower the bid, the lower the payment is for being silent.

As would be understood by one of ordinary skill in the art, based on the disclosure and teachings herein, a wide variety of auction types may be used to determine exactly how much each active cognitive radio is to pay into the pool of auction winnings. In some arrangements, a second bid auction format is used to determine the amount owed by a winning cognitive radio bidder. In other arrangements, a first price auction format is used to determine the amount owed by a winning cognitive radio bidder.

In one arrangement, the losing bidders are blocked from accessing the available bandwidth by being placed on a "no access" list. A device identifier such as an IP address, IMEI number, or the like is entered into the "no access" list. The blocked device then has an opportunity to rebid to access the network. It should be noted that the device will not receive the payment if it accesses the network or may only receive a portion of the initial silence payment.

Collaborative Spectrum Mapping and Reputation Management

In a given method and system, a group of mobile devices collaboratively use distributed detection to create global maps of cell phone coverage stored locally in their respective on-board memories.

In particular, when a mobile application is run on a first mobile device, the first mobile device continually collects signal quality strength measurements associated with the physical locations that the first mobile device traverses through (these measurements can all pertain to a single network/Internet gateway or the measurements may include separate data for more than one network/Internet gateway). When the first mobile device encounters a second mobile device which is also running the application, the first mobile device offers to "sell" its collected signal quality information to the second mobile device (the sale can be in the form of currency such as US dollars, Bitcoins, or any other suitable form). Similarly, the second mobile device offers to sell its collected information to the first mobile device.

In this way, a mobile device (e.g., the first or second mobile device above) can, through repeatedly buying information from other mobile devices, create an increasingly large geographic map of signal strength quality. This mobile device can then make informed data routing decisions to send and receive data along paths and networks/Gateways that ensure it a high data throughput.

Similarly, a mobile device (e.g., the first or second mobile device above) can, through repeatedly selling information to other mobile devices, provide a payment stream to a user of the mobile device. This may incentive the user to carry around a larger cell phone (i.e., one having a larger battery) as the user can profit from the extra measurements that such an "enhanced" device can take over a long period of time without depleting the battery.

Additionally or alternatively to signal strength information, cell phones running the mobile application can measure radiation produced by nodes in its vicinity over time. By doing so, a given mobile device builds a local "reputation" score for all the devices it encounters. That is, devices observed to be transmitting frequently over a large period of time (particularly when other devices are transmitting) are assessed a low reputation score while devices observed to be transmitting rarely (particularly if they transmit when no or only a few other devices are transmitting) are assigned a higher reputation score. In other words, frequent users have lower reputations than those that provide more availability. When this reputation data is exchanged among mobile devices running the application, each mobile device is able to maintain a reputation database concerning a large number of mobile devices. Given this information, a mobile phone can decide which nodes to "respect" (i.e., stay silent in view of the communications of) and which to disregard based on their respective reputation scores.

In one arrangement, each device exchanged its reputation score with other devices. In this manner, a fair weighted device reputation can be established. In other words, if two devices meet only once and one of those devices is busy, the device that is not busy will assign a low reputation score to the busy device. The busy device provides its reputation score, which has been aggregated over time, to the new device so that an aggregated reputation score can be stored in the new device.

Implementing a Cognitive Engine on a Chip

Consider two radios (e.g., cell phones) located in proximity to each other, where each radio wishes to establish a wireless connection (e.g., a cellular or WiFi connection) to its respective network access provider (the network access provider may be the same or different for the two radios). If both radios agreed to cooperatively schedule their transmissions, a typical strategy for maximizing average throughout and ensuring fairness would be for each radio to employ a "wait-then-transmit" protocol. According to this protocol, the first radio transmits during certain time slots and stays silent during other time slots. In turn, the second radio transmits during silent periods in the first radio's communications and stays silent at other times. This strategy has the advantage of allowing each radio to transmit free from interference of the other radio.

However, without a suitable enforcement or authentication mechanism, neither radio is likely to adhere to such a wait-then-transmit policy. This is because a given radio (e.g., the first radio) has no assurance that if it remains silent in one period that the other radio will "return the favor" by remaining silent in the next. Indeed, without such a guarantee in place, it is more likely that each radio will simply act "selfishly" and attempt to transmit whenever it has data to send without regard to the transmission behavior of the other radio. Unfortunately, when two radios engage in individually selfish behavior, the net throughput for all cognitive radios may be significantly lowered. The same concepts and principles apply when more than two radios exist but two radios are used to simplify the current discussion.

Authentication techniques may be used to provide assurances to each radio that the other will cooperate so that both radios deem it in their best interest to adopt a wait-then-transmit protocol. In particular, presented herein are authentication and verification techniques to ensure that (a) a given radio regulates its own transmission in certain time periods (i.e., stays silent) and (b) in return, it thereby gains full access to the spectrum in other periods (i.e., the other radio(s) stays silent). Specifically, according to the disclosed systems, methods, and techniques, each of the first radio and second radio has installed a secure, embedded chip (referred to as a "cognitive engine chip"). The chip includes encryption and decryption circuitry, communications protocol circuitry, and on-board memory storing at least a private key associated with the radio in which the chip is located. The communications protocol circuitry stores instructions defining the spectrum access strategy used by the cognitive radio (e.g., the time slots in which it may transmit and time slots in which it remains silent as a function of a number of other cognitive devices in the vicinity).

When a first radio enabled with a cognitive engine chip encounters a second radio, the first radio begins a negotiation/authentication process to determine whether the second radio also contains such a cognitive chip (the negotiation process may begin in response to a determination that the two radios are sufficiently close to each other in terms of GPS coordinates and/or velocity measurements and/or any other suitable factor(s)). If so, the first radio operates according to the communications protocol defined by its chip. If, on the other hand, the first cognitive radio is not able to make such a determination, it communicates selfishly and without regard or with minimal regard for fairness to the second radio.

The negotiation/authentication process is described next. The first radio will attempt to authenticate the second radio to determine if the second radio also has a cognitive engine chip (and will therefore respect and cooperate with the first radio).

Specifically, the cognitive engine chip in the first radio generates a message announcing that it follows (a standardized) protocol defined by its cognitive engine chip. In particular, the cognitive engine chip retrieves its stored private key and generates a digital signature from the private key and the message. The cognitive chip then outputs the message and the digital signature, which are encoded and transmitted to the second radio.

When a second radio, also equipped with a cognitive engine chip, receives the message and signature, it accesses a public key of the first radio and processes the message and digital signature using the public key to determine whether the message is valid (i.e., whether the first cognitive radio is indeed equipment with a cognitive engine chip or if a fraudulent message has been received). If the message is valid, the second cognitive radio operates according to the communications protocol stored in its own cognitive engine chip and "respects" transmissions of the first cognitive radio and does not transmit (or rarely) transmits when it detects that the first cognitive radio is transmitting. As would be understood by one of ordinary skill in the art, a similar process may be followed by the second cognitive radio to authenticate the first cognitive radio.

In this way, the first and second radios can authenticate that the other is transmitting according to a "fair" protocol defined by the cognitive radio chip. As such, each device is able to respect the other's communications by staying silent and then gaining access to a high throughput connection during its own communications.

To ensure that the message and digital signature transmitted from the first radio is trusted and has not been tampered with, the cognitive engine chip is preferably placed within a physically secure boundary in the cognitive radio. In arrangements, all components of the chip (including the encryption, decryption, and communications protocol circuitry and the on-board memory) are located on a single piece of a physical silicon die. In some arrangements, a tamper-proof fuse or another device that erases the contents of memory if a chip tamper event is detected protects the cognitive engine chip.

As another form of protection, a given radio enabled with a cognitive engine chip may perform monitoring during communications to ensure that other radios previously authenticated as operating according to a cognitive engine chip are indeed communicating according to a pre-defined and "fair" protocol. If, e.g., a first radio detects that the second radio is not communicating according to the protocol, it may cease to operate in cooperative mode and instead transmits data selfishly without regard for the second radio's communications.

Although a given cognitive engine chip has been described as containing a signal communications protocol, it will be understood by one of ordinary skill in the art, based on the disclose and teachings herein, that a given chip may store a number of communications protocols and select from among them. In particular, all the protocols should adhere to a fairness criteria. In some arrangements, the message generated by a first radio depends on the particular protocol used and a recipient second radio may base its own protocol selection on the protocol that the first radio is using. For example, the second radio may choose the same protocol that the first radio is using.

Maintaining Bitcoin Status

A system in which a first device (e.g., cell phone, tablet, laptop, or computer) wishes to exchanges Bitcoins with a vendor. If the Bitcoin exchange is performed directly between the first device and the vendor in the traditional way, it may be several minutes (or longer) before the Bitcoin transaction is authorized and the transaction completed. As an alternative, the first device may place a sum of Bitcoins in excess of the transaction amount in an electronic escrow prior to initiating the transaction. When, e.g., the first device initiates the purchase from the second device, the escrow verifies that the first device has the Bitcoins available to complete the transaction and the transaction can be "finalized" (i.e., the purchased goods/services can be delivered to the purchaser) without waiting for the formalities of the Bitcoin transaction to complete. In this way, the transactions involving Bitcoins are effectively completed more quickly than would otherwise be possible.

The present invention may be described herein in terms of functional block components, code listings, optional selections, and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices.

Similarly, the software elements of the present invention may be implemented with any programming or scripting language such as C, C++, C#, Java, COBOL, assembler, PERL, or the like, with the various algorithms being implemented with any combination of data structures, objects, processes, routines or other programming elements.

Further, it should be noted that the present invention may employ any number of conventional techniques for data transmission, signaling, data processing, network control, and the like.

It should be appreciated that the particular implementations shown and described herein are illustrative of the invention and its best mode and are not intended to otherwise limit the scope of the present invention in any way. Indeed, for the sake of brevity, conventional data networking, and application development and other functional aspects of the systems (and components of the individual operating components of the systems) may not be described in detail herein. Furthermore, the connecting lines shown in the various figures contained herein are intended to represent exemplary functional relationships and/or physical or virtual couplings between the various elements. It should be noted that many alternative or additional functional relationships or physical or virtual connections may be present in a practical electronic data communications system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, SD cards, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

One skilled in the art will appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The scope of the invention should be determined by the appended claims and their legal equivalents, rather than by the examples given herein. For example, the steps recited in any method claims may be executed in any order and are not limited to the order presented in the claims. Moreover, no element is essential to the practice of the invention unless specifically described herein as "critical" or "essential."

In the specification, the term "media" means any medium that can record data therein. The term "media" includes, for instance, a disk shaped media for such as CD-ROM (compact disc-read only memory), magneto optical disc or MO, digital video disc-read only memory or DVD-ROM, digital video disc-random access memory or DVD-RAM, a floppy disc, a memory chip such as random access memory or RAM, read only memory or ROM, erasable programmable read only memory or E-PROM, electrical erasable programmable read only memory or EE-PROM, a rewriteable card-type read only memory such as a smart card, a magnetic tape, a hard disc, and any other suitable means for storing a program therein.

A recording media storing a program for accomplishing the above mentioned apparatus may be accomplished by programming functions of the above mentioned apparatuses with a programming language readable by a computer or processor, and recording the program on a media such as mentioned above.

A server equipped with a hard disk drive may be employed as a recording media. It is also possible to accomplish the present invention by storing the above mentioned computer program on such a hard disk in a server and reading the computer program by other computers through a network.

As a computer-processing device, any suitable device for performing computations in accordance with a computer program may be used. Examples of such devices include a personal computer, a laptop computer, a microprocessor, a programmable logic device, or an application specific integrated circuit.

While this invention has been described by reference to a preferred embodiment, it should be understood that numerous changes could be made within the spirit and scope of the inventive concepts described. Accordingly, it is intended that the invention not be limited to the disclosed embodiment, but that it have the full scope permitted by the language of the following claims.

We claim:

1. A mobile device comprising:
a processor; and
a memory storing computer executable instructions, which, when executed by the processor, cause the mobile device to:
receive a first request to download a data file;
determine a time constraint associated with the download of the data file;
in response to a determination that a bandwidth of the mobile device is insufficient for the download of the data file within the time constraint, transmit a second request to one or more potential collaborator devices;
assign a respective portion of the data file to a number of collaborator devices selected from the one or more potential collaborator devices;
receive the assigned respective portions of the data file from the number of collaborator devices; and
store the assigned portions of the data file in the memory.

2. The mobile device of claim 1, wherein the number of collaborator devices comprises at least one stationary hotspot device.

3. The mobile device of claim 1, wherein the first request comprises a request for an identity and a bandwidth availability of a potential collaborator device.

4. The mobile device of claim 3, wherein the computer executable instructions, when executed by the processor, cause the mobile device to select the number of collaborator devices from the one or more potential collaborator devices based on respective bandwidth availabilities advertised by the one or more potential collaborator devices.

5. The mobile device of claim 1, wherein the first request is received automatically, without any further user input, based on a predefined schedule.

6. The mobile device of claim 1, wherein the computer executable instructions, when executed by the processor, cause the mobile device to determine the time constraint based on accessing calendar information stored on the mobile device.

7. The mobile device of claim 1, wherein the computer executable instructions, when executed by the processor, cause the mobile device to determine the time constraint based on accessing travel schedule information stored on the mobile device.

8. The mobile device of claim 1, wherein the computer executable instructions, when executed by the processor, cause the mobile device to determine the time constraint based on a predicted time at which a network connection of the mobile device will become unavailable.

9. The mobile device of claim 1, wherein the computer executable instructions, when executed by the processor, cause the mobile device to:
monitor an actual bandwidth provided by a respective collaborator device in the number of collaborator devices; and
remove the collaborator device from the number of collaborator devices in response to a determination that the actual bandwidth of the collaborator device is less than a bandwidth previously advertised by the collaborator device.

10. The mobile device of claim 1, wherein the computer executable instructions, when executed by the processor, cause the mobile device to:
monitor an actual bandwidth provided by each of the number of collaborator devices; and
add an additional collaborator device to the number of collaborator devices based on a determination that mobile device is not on pace to download the data file within the time constraint according to the monitored actual bandwidth provided by each of the number of collaborator devices.

11. A method for retrieving a data file using a collaborator device, the method comprising:
receiving a first request to download the data file;
determining a time constraint associated with the download of the data file;
in response to a determination that a bandwidth of a mobile device is insufficient for the download of the data file within the time constraint, transmitting a second request to one or more potential collaborator devices;
assigning a respective portion of the data file to a number of collaborator devices selected from the one or more potential collaborator devices;
receiving the assigned respective portions of the data file from the number of collaborator devices; and
storing the assigned portions of the data file in the memory.

12. The method of claim 11, wherein the number of collaborator devices comprises at least one stationary hotspot device.

13. The method of claim 11, wherein the first request comprises a request for an identity and a bandwidth availability of a potential collaborator device.

14. The method of claim 13, comprising selecting the number of collaborator devices from the one or more potential collaborator devices based on respective bandwidth availabilities advertised by the one or more potential collaborator devices.

15. The method of claim 11, wherein the first request is received automatically, without any further user input, based on a predefined schedule.

16. The method of claim 11, comprising determining the time constraint based on accessing calendar information stored on the mobile device.

17. The method of claim 11, comprising determining the time constraint based on accessing travel schedule information stored on the mobile device.

18. The method of claim 11, comprising determining the time constraint based on a predicted time at which a network connection of the mobile device will become unavailable.

19. The method of claim 11, comprising:
monitoring an actual bandwidth provided by a respective collaborator device in the number of collaborator devices; and
removing the collaborator device from the number of collaborator devices in response to a determination that the actual bandwidth of the collaborator device is less than a bandwidth previously advertised by the collaborator device.

20. The method of claim 11, comprising monitoring an actual bandwidth provided by each of the number of collaborator devices; and
adding an additional collaborator device to the number of collaborator devices based on a determination that mobile device is not on pace to download the data file within the time constraint according to the monitored actual bandwidth provided by each of the number of collaborator devices.

* * * * *